US011650685B2

(12) United States Patent
Mizuhashi et al.

(10) Patent No.: US 11,650,685 B2
(45) Date of Patent: *May 16, 2023

(54) DISPLAY PANEL WITH TOUCH DETECTION FUNCTION, METHOD OF DRIVING THE SAME, DRIVING CIRCUIT, AND ELECTRONIC UNIT

(71) Applicant: Japan Display Inc., Tokyo (JP)

(72) Inventors: Hiroshi Mizuhashi, Kanagawa (JP); Yoshitoshi Kida, Kanagawa (JP); Koji Noguchi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/673,872

(22) Filed: Feb. 17, 2022

(65) Prior Publication Data

US 2022/0171486 A1 Jun. 2, 2022

Related U.S. Application Data

(63) Continuation of application No. 17/204,182, filed on Mar. 17, 2021, now Pat. No. 11,287,916, which is a continuation of application No. 16/738,584, filed on Jan. 9, 2020, now Pat. No. 10,983,623, which is a continuation of application No. 16/236,765, filed on Dec. 31, 2018, now Pat. No. 10,572,090, which is a continuation of application No. 15/959,742, filed on Apr. 23, 2018, now Pat. No. 10,203,829, which is a continuation of application No. 15/845,740, filed on Dec. 18, 2017, now Pat. No. 10,013,131, which is a continuation of application No. 15/630,091, filed on Jun. 22, 2017, now Pat. No. 9,864,473, which is a continuation of application No. 14/842,291, filed on Sep. 1, 2015, now Pat. No. 9,715,318, which is a continuation of application No. 14/306,633, filed on (Continued)

(30) Foreign Application Priority Data

Apr. 13, 2011 (JP) .................................. 2011-089429
Nov. 4, 2011 (JP) .................................. 2011-242797

(51) Int. Cl.
*G06F 3/041* (2006.01)
*G06F 3/044* (2006.01)

(52) U.S. Cl.
CPC .......... *G06F 3/0412* (2013.01); *G06F 3/0445* (2019.05); *G06F 3/0446* (2019.05)

(58) Field of Classification Search
CPC ..... G06F 3/0412; G06F 3/0445; G06F 3/0446
See application file for complete search history.

(56) References Cited

U.S. PATENT DOCUMENTS 10,983,623 B2 * 4/2021 Mizuhashi ............ G06F 3/0446

* cited by examiner

*Primary Examiner* — Kenneth B Lee, Jr.
(74) *Attorney, Agent, or Firm* — Michael Best & Friedrich LLP

(57) ABSTRACT

A display panel with a touch detection function, in which display operation is less affected by touch detection operation, a method of driving the display panel with a touch detection function, a driving circuit, and an electronic unit having the display panel with a touch detection function are disclosed. The display panel with a touch detection function includes: one or more display elements; one or more drive electrodes; one or more touch detection electrodes; and a drive section selectively applying a DC drive signal or an AC drive signal to the drive electrodes.

21 Claims, 25 Drawing Sheets

Related U.S. Application Data

Jun. 17, 2014, now Pat. No. 9,141,247, which is a continuation of application No. 13/414,363, filed on Mar. 7, 2012, now Pat. No. 8,791,916.

DISPLAY PANEL WITH TOUCH DETECTION FUNCTION, METHOD OF DRIVING THE SAME, DRIVING CIRCUIT, AND ELECTRONIC UNIT

CROSS REFERENCES TO RELATED APPLICATIONS

This is a Continuation Application of the U.S. patent application Ser. No. 17/204,182, filed Mar. 17, 2021, which is a Continuation Application of the U.S. patent application Ser. No. 16/738,584, filed Jan. 9, 2020, now U.S. Pat. No. 10,983,623, issued on Apr. 20, 2021, which is a Continuation Application of the U.S. patent application Ser. No. 16/236,765, filed Dec. 31, 2018, now U.S. Pat. No. 10,572,090, issued on Feb. 25, 2020, which is a Continuation Application of the U.S. patent application Ser. No. 15/959,742, filed Apr. 23, 2018, now U.S. Pat. No. 10,203,829, issued on Feb. 12, 2019, which is a Continuation Application of the U.S. patent application Ser. No. 15/845,740, filed Dec. 18, 2017, now U.S. Pat. No. 10,013,131, issued on Jul. 3, 2018, which is a Continuation Application of the U.S. patent application Ser. No. 15/630,091, filed Jun. 22, 2017, now U.S. Pat. No. 9,864,473, issued on Jan. 9, 2018, which is a Continuation Application of the U.S. patent application Ser. No. 14/842,291, filed Sep. 1, 2015, now U.S. Pat. No. 9,715,318, issued on Jul. 25, 2017, which is a Continuation Application of the U.S. patent application Ser. No. 14/306,633, filed Jun. 17, 2014, now U.S. Pat. No. 9,141,247, issued on Sep. 22, 2015, which is a Continuation Application of the U.S. patent application Ser. No. 13/414,363, filed Mar. 7, 2012, now U.S. Pat. No. 8,791,916, issued on Jul. 29, 2014, which claims priority from Japanese Patent Application No.: 2011-089429, filed Apr. 13, 2011, and Japanese Patent Application No.: 2011-242797, filed Nov. 4, 2011, the entire contents of which being incorporated herein by reference.

BACKGROUND

The present disclosure relates to a display panel with a touch detection function of detecting a touch event due to an external proximity object, a method of driving the same, a driving circuit, and an electronic unit having the display panel with a touch detection function.

Recently, a display panel has been notified, where a touch detection device, a so-called touch panel, is mounted on a display unit such as a liquid crystal display unit, or the touch panel is integrated with the display unit, and various button images and the like are displayed on the display unit for inputting information, instead of typical mechanical buttons. Such a display panel having the touch panel needs not have an input device such as a keyboard, a mouse, and a keypad and therefore tends to be expansively used not only for computers but also for handheld information terminals such as mobile phones.

A type of the touch panel includes several types such as an optical type and a resistant type. In particular, a capacitance-type touch panel has been promising as a device allowing low power consumption with a relatively simple structure. For example, Japanese Unexamined Patent Application Publication No. 2009-244958 (JP-A-2009-244958) proposes a so-called in-cell-type display panel with a touch detection function, where a common-electrode originally provided for display of a display unit is used also as one of a pair of electrodes for a touch sensor, and the other electrode (touch detection electrode) is disposed to intersect the common electrode. In addition, several propositions have been made on a so-called on-cell-type display panel with a touch detection function, in which a touch panel is provided on a display surface of a display unit.

SUMMARY

In the display panel with a touch detection function, since a display function is integrated with the touch detection function, for example, display operation may be affected by operation for touch detection. However, JP-A-2009-244958 has no description on such influence and measures against the influence.

It is desirable to provide a display panel with a touch detection function, in which display operation is less affected by touch detection operation, a method of driving the display panel with a touch detection function, a driving circuit, and an electronic unit having the display panel with a touch detection function.

A display panel with a touch detection function according to an embodiment of the disclosure includes one or more display elements; one or more drive electrodes; one or more touch detection electrodes; and a drive section. The drive section selectively applies a DC drive signal or an AC drive signal to the drive electrodes.

A method of driving the display panel with a touch detection function according to an embodiment of the disclosure includes driving one or more display elements for display, and selectively applying a DC drive signal or an AC drive signal to the one or more drive electrodes.

A drive circuit according to an embodiment of the disclosure includes a display drive section and a touch detection drive section. The display drive section drives one or more display elements. The touch detection drive section selectively applies a DC drive signal or an AC drive signal to one or more drive electrodes.

An electronic unit according to an embodiment of the disclosure includes a display panel with a touch detection function, and a control section controlling operation using the display panel with a touch detection function. The display panel with a touch detection function includes one or more display elements, one or more drive electrodes, one or more touch detection electrodes, and a drive section selectively applying a DC drive signal or an AC drive signal to the drive electrodes. Such an electronic unit includes, for example, a television apparatus, a digital camera, a personal computer, a video camera, and a mobile terminal device such as a mobile phone.

In the display panel with a touch detection function and the method of driving the display panel with a touch detection function, the drive circuit, and the electronic unit according to the embodiments of the disclosure, the display elements are driven for display, a drive signal is applied to the drive electrodes, and the touch detection electrodes output a signal corresponding to the drive signal. At that time, one of the DC drive signal and the AC drive signal is selectively applied as the drive signal to the drive electrodes.

According to the display panel with a touch detection function and the method of driving the display panel with a touch detection function, the drive circuit, and the electronic unit according to the embodiments of the disclosure, since the DC drive signal or the AC drive signal is selectively applied to the drive electrodes, display operation is less affected by touch detection operation.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, embodiments of the disclosure will be described in detail with reference to the accompanying drawings. It is to be noted that description is made in the following order.
1. Basic Principle of Capacitance-Type Touch Detection
2. First Embodiment
3. Second Embodiment
4. Application Examples

1. BASIC PRINCIPLE OF CAPACITANCE-TYPE TOUCH DETECTION

First, a basic principle of touch detection of a display panel with a touch detection function according to embodiments of the disclosure is described with reference to FIGS. 1 to 3. This touch detection process is embodied as a capacitance-type touch sensor. In the capacitance-type touch sensor, for example, a pair of electrodes (drive electrode E1 and touch detection electrode E2) disposed to face each other with a dielectric body D in between are used to configure a capacitance element, as illustrated in (A) of FIG. 1. Such a structure is expressed as an equivalent circuit illustrated in (B) of FIG. 1. The drive electrode E1, the touch detection electrode E2, and the dielectric body D define a capacitance element C1. One end of the capacitance element C1 is connected to an AC signal source (drive signal source) S, and the other end P is grounded through a resistor R and connected to a voltage detector (a touch detection circuit) DET. After an AC rectangular wave Sg ((B) of FIG. 3) having a predetermined frequency (for example, approximately several kilohertz to several tens kilohertz) is applied from the AC signal source S to the drive electrode E1 (a first end of the capacitance element C1), an output waveform (a touch detection signal) Vdet, as illustrated in (A) of FIG. 3 is shown at the touch detection electrode E2 (a second end P of the capacitance element C1). It is to be noted that the AC rectangular wave Sg corresponds to an AC drive signal VcomAC described below.

Figure 1:
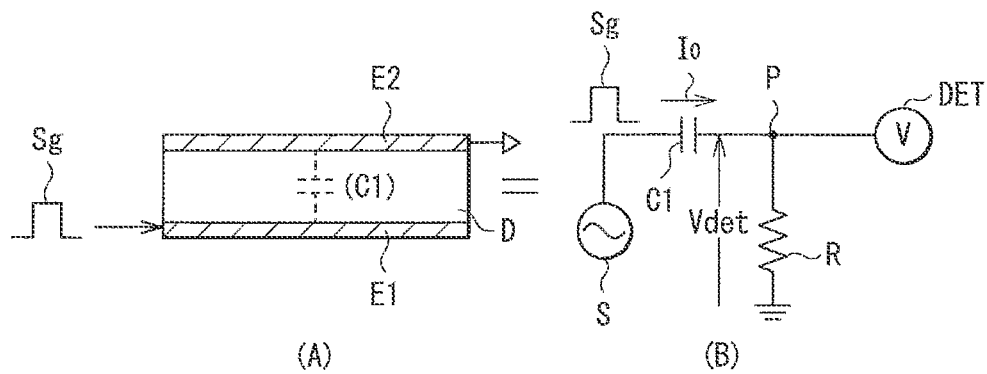
FIG. 1 is a diagram for explaining a basic principle of a touch detection process of a display panel with a touch detection function according to embodiments of the disclosure, showing a state where a finger is not in contact with or not in proximity to the display panel.

In a state where a finger is not in contact with (or not in proximity to) the display panel, current I0 corresponding to a capacitance value of the capacitance element C1 flows in response to charge and discharge with respect to the capacitance element C1 as illustrated in FIG. 1. Here, a potential waveform at the second end P of the capacitance element C1 is, for example, as shown by a waveform V0 in (A) of FIG. 3, which is detected by the voltage detector DET.

Figure 2:
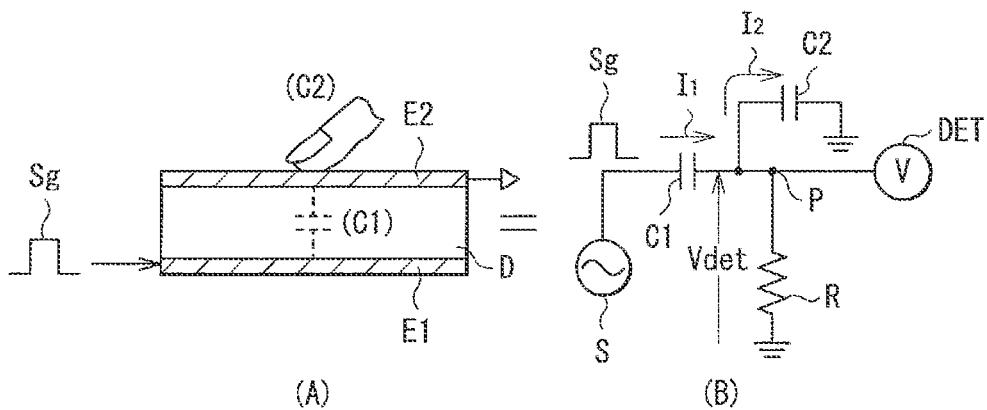
FIG. 2 is a diagram for explaining the basic principle of the touch detection process of the display panel with a touch detection function according to the embodiments of the disclosure, showing a state where a finger is in contact with or in proximity to the display panel.
Figure 3:
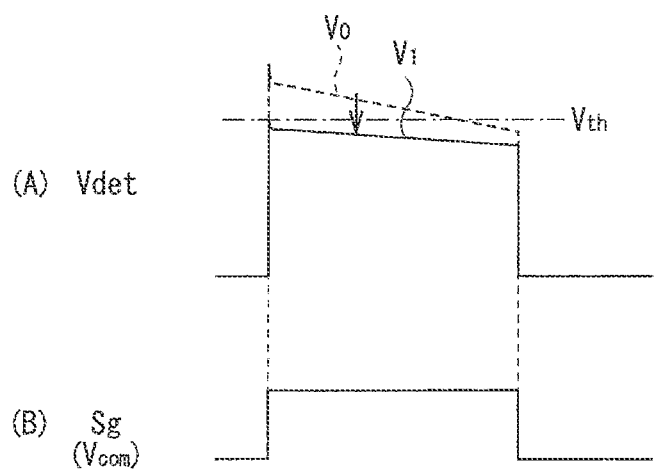
FIG. 3 is a diagram for explaining the basic principle of the touch detection process of the display panel with a touch detection function according to the embodiments of the disclosure, showing exemplary waveforms drawings of a drive signal and a touch detection signal.

On the other hand, in a state where a finger is in contact with (or in proximity to) the display panel, a capacitance element C2 is formed by a finger and is added in series to the capacitance element C1 as illustrated in FIG. 2. In this state, a current I1 and a current I2 flow in response to charge and discharge of the capacitance elements C1 and C2, respectively. Here, a potential waveform at the second end P of the capacitance element C1 is, for example, as shown by a waveform V1 in (A) of FIG. 3, which is detected by the voltage detector DET. Here, electric potential of the point P corresponds to a divided potential determined by the values of the currents I1 and I2 flowing through the respective capacitance elements C1 and C2. The waveform V1, therefore, has a small value compared with the waveform V0 in the non-contact state. The voltage detector DET compares a detected voltage with a predetermined threshold voltage Vth. If the detected voltage is equal to or higher than the threshold voltage, the voltage detector DET determines that no contact occurs. If the detected voltage is lower than the threshold voltage, the voltage detector DET determines that some contact occurs. In this way, touch detection is performed.

2. FIRST EMBODIMENT

Exemplary Configuration

Exemplary Overall Configuration

Figure 4:
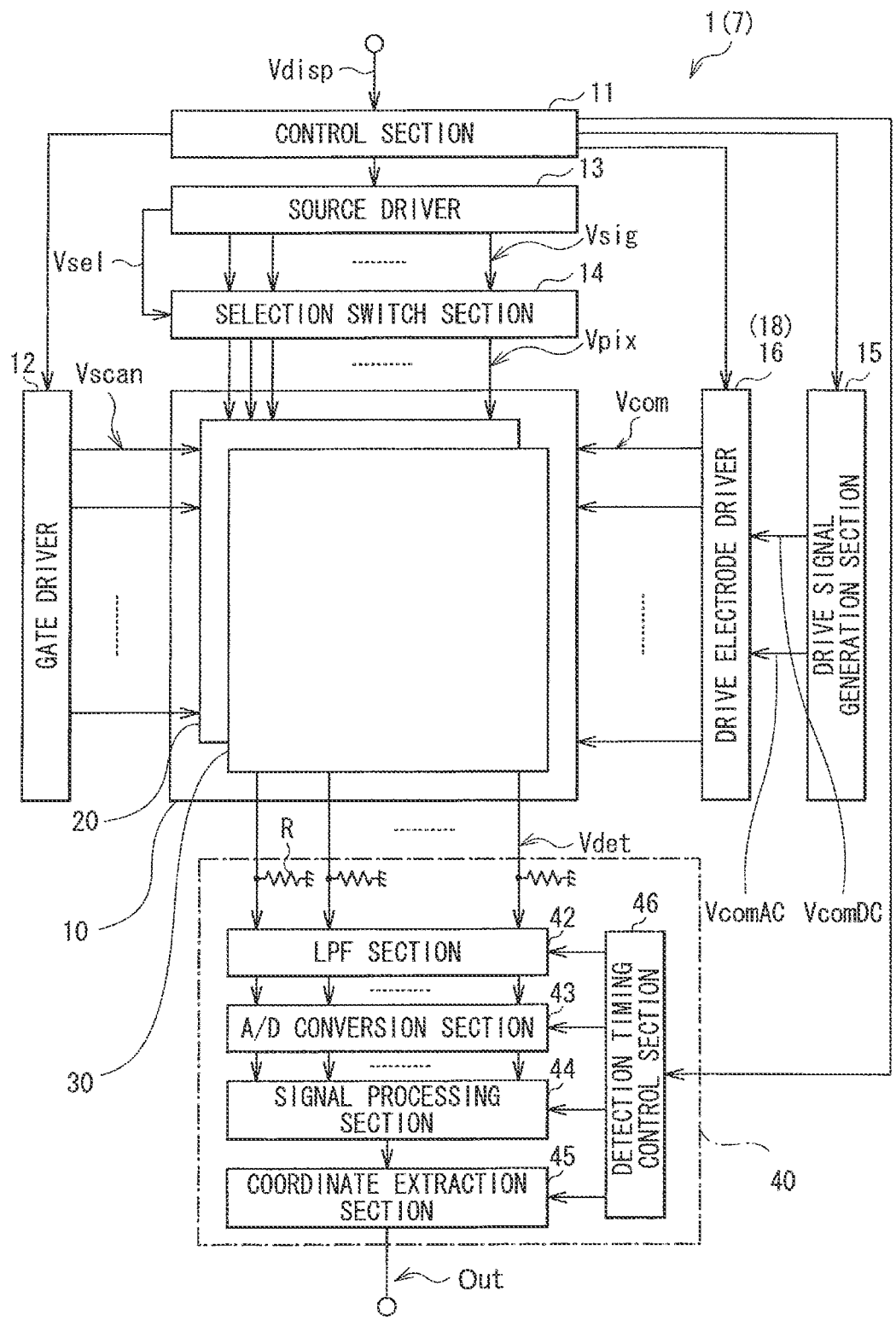
FIG. 4 is a block diagram illustrating an exemplary configuration of a display panel with a touch detection function according to a first embodiment of the disclosure.

FIG. 4 illustrates an exemplary configuration of a display panel with a touch detection function 1 according to a first embodiment. The display panel includes liquid crystal display elements as display elements, and is a so-called in-cell type display panel, in which a liquid crystal display device configured of the liquid crystal display elements is integrated with a capacitance-type touch detection device.

The display panel with a touch detection function 1 includes a control section 11, a gate driver 12, a source driver 13, a selection switch section 14, a drive signal generation section 15, a drive electrode driver 16, a display device with a touch detection function 10, and a touch detection section 40.

The control section 11 is a circuit that supplies a control signal to each of the gate driver 12, the source driver 13, the drive signal generation section 15, the drive electrode driver 16, and the touch detection section 40 based on a video signal Vdisp supplied from the outside, and controls the components to operate in synchronization with one another.

The gate driver 12 has a function of sequentially selecting one horizontal line as a display drive object in the display device with a touch detection function 10 based on the control signal supplied from the control section 11. In detail, the gate driver 12 generates a scan signal Vscan based on the control signal supplied from the control section 11, and applies the scan signal Vscan to a gate of a TFT element Tr of each pixel Pix through a scan signal line GCL to sequentially select one row (one horizontal line) as a display drive object of pixels Pix provided in a matrix in a liquid crystal display device 20 of the display device with a touch detection function 10.

The source driver 13 generates and outputs a pixel signal Vsig based on a video signal and a source driver control signal supplied from the control section 11. In detail, the source driver 13 generates the pixel signal Vsig, in which pixel signals Vpix for a plurality of (here, three) sub-pixels SPix of the liquid crystal display device 20 of the display device with a touch detection function 10 are time-divisionally multiplexed, from a video signal corresponding to one horizontal line, and supplies the pixel signal Vsig to the selection switch section 14, as described below. In addition, the source driver 13 generates a switching control signal Vsel (VselR, VselG, and VselB) necessary for demultiplexing the pixel signals Vpix multiplexed into the pixel signal Vsig, and supplies the switching control signal Vsel together with the pixel signal Vsig to the selection switch section 14. It is to be noted that such multiplexing is performed to reduce the number of wirings between the source driver 13 and the selection switch section 14.

The selection switch section 14 demultiplexes the pixel signals Vpix, which have been time-divisionally multiplexed into the pixel signal Vsig, based on the pixel signal Vsig and the switching control signal Vsel supplied from the source driver 13, and supplies the pixel signals Vpix to the liquid crystal display device 20 of the display device with a touch detection function 10.

Figure 5:
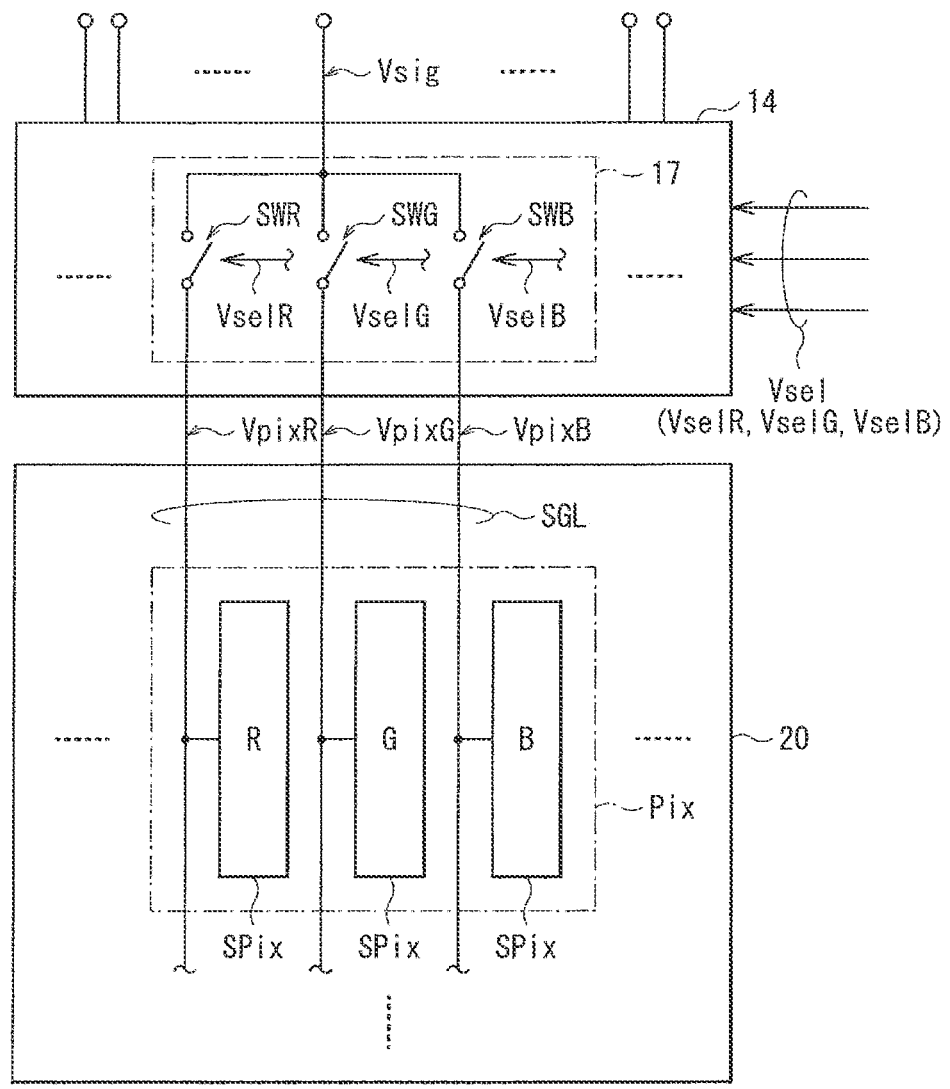
FIG. 5 is a block diagram illustrating an exemplary configuration of a selection switch section shown in FIG. 4.

FIG. 5 illustrates an exemplary configuration of the selection switch section 14. The selection switch section 14 has a plurality of switch groups 17. Each switch group 17 includes three switches SWR, SWG, and SWB herein, where respective first ends of the switches are connected to one another and supplied with a pixel signal Vsig from the source driver 13, and respective second ends thereof are connected to three sub-pixels SPix (R, G, and B) relevant to a pixel Pix through pixel signal lines SGL of the liquid crystal display device 20 of the display device with a touch detection function 10. The respective three switches SWR, SWG, and SWB are controlled to be on or off by the switching control signal Vsel (VselR, VselG, and VselB) supplied from the source driver 13. According to such a configuration, the selection switch section 14 sequentially changes the three switches SWR, SWG, and SWB in a time-divisional manner to be on in response to the switching control signal Vsel, thereby demultiplexing the pixel signals Vpix (VpixR, VpixG, and VpixB) from the multiplexed pixel signal Vsig. In addition, the selection switch section 14 supplies the respective pixel signals Vpix to the three sub-pixels SPix (R, G, and B).

The drive signal generation section 15 generates a drive signal Vcom based on a control signal supplied from the control section 11. In detail, the drive signal generation section 15 generates a DC drive signal VcomDC and generates an AC drive signal VcomAC based on a Vcom control signal EXVCOM (described below) supplied from the control section 11, and supplies the signals to the drive electrode driver 16, as described below. The DC drive signal VcomDC is a DC signal having a voltage of 0 V. The AC drive signal VcomAC has a pulse waveform having a low-level voltage of 0 V and a high-level voltage of VH.

The drive electrode driver 16 is a circuit that supplies the drive signal Vcom to drive electrodes COML (described below) of the display device with a touch detection function 10 based on a control signal supplied from the control section 11. In detail, the drive electrode driver 16 applies the AC drive signal VcomAC to the relevant drive electrodes COML in touch detection operation. At that time, the drive electrode driver 16 drives the drive electrodes COML by one block (drive electrode block B described below) including a predetermined number of drive electrodes COML at a time. In addition, the drive electrode driver 16 applies the DC drive signal VcomDC to the drive electrodes COML other than the drive electrodes COML relevant to the touch detection operation.

The display device with a touch detection function 10 is a display device in which a touch detection function is embedded. The display device with a touch detection function 10 includes the liquid crystal display device 20 and a touch detection device 30. The liquid crystal display device 20 performs sequential scan by one horizontal line basis for performing display in response to scan signals Vscan supplied from the gate driver 12, as described below. The touch detection device 30 operates on the basis of the above-described basic principle of the capacitance-type touch detection and outputs a touch detection signal Vdet. The touch detection device 30 performs sequential scan in response to the AC drive signal VcomAC supplied from the drive electrode driver 16 to perform touch detection, as described below.

The touch detection section 40 detects presence of a touch event in the touch detection device 30 based on a touch detection control signal supplied from the control section 11 and the touch detection signal Vdet supplied from the touch detection device 30 of the display device with a touch detection function 10, and obtains the coordinates of a touch event in a touch detection region if the touch event is detected. The touch detection section 40 includes a low pass filter (LPF) section 42, an A/D conversion section 43, a signal processing section 44, a coordinate extraction section 45, and a detection timing control section 46. The LPF section 42 is a low-pass analog filter that removes the high-frequency components (noise components) contained in the touch detection signal Vdet supplied from the touch detection device 30, and thus extracts and outputs the touch components. A resistance R for providing a DC potential (0 V) is connected between each of input terminals of the LPF section 42 and ground. It is to be noted that, for example, a switch may be provided in place of the resistance R such that the switch is turned on at a predetermined timing so as to provide the DC potential (0 V). The A/D conversion section 43 is a circuit that samples each of the analog signals output from the LPF section 42 at a timing in synchronization with the AC drive signal VcomAC, and converts the analog signals to digital signals. The signal processing section 44 is a logical circuit that detects presence of a touch event in the touch detection device 30 based on signals output from the A/D conversion section 43. The coordinate extraction section 45 is a logical circuit that determines touch-panel coordinates of a touch event if signal processing section 44 detects a touch event. The detection timing control section 46 controls these circuits to operate in synchronization with one another.

(Display Device with Touch Detection Function 10)

An exemplary configuration of the display device with a touch detection function 10 is now described in detail.

Figure 6:
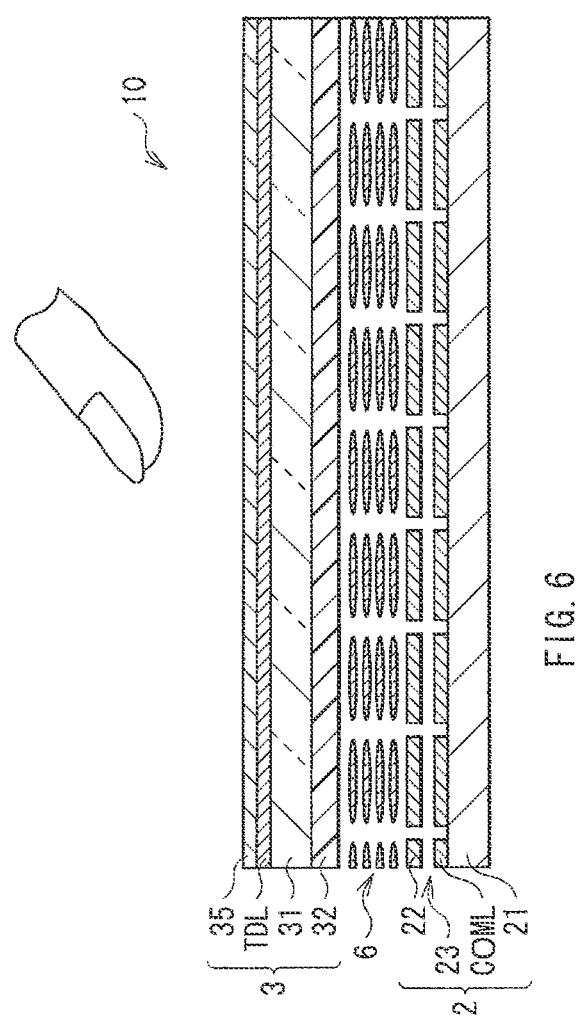
FIG. 6 is a sectional diagram illustrating a schematic sectional structure of a display device with a touch detection function shown in FIG. 4.

FIG. 6 illustrates an exemplary sectional structure of a major part of the display device with a touch detection function 10. The display device with a touch detection function 10 includes a pixel substrate 2, a counter substrate 3 disposed to face the pixel substrate 2, and a liquid crystal layer 6 interposed between the pixel substrate 2 and the counter substrate 3.

The pixel substrate 2 includes a TFT substrate 21 as a circuit substrate, the drive electrodes COML, and pixel electrodes 22. The TFT substrate 21 functions as a circuit substrate on which various kinds of electrodes, wirings, thin film transistors (TFTs), and the like are provided. The TFT substrate 21 is configured of, for example, glass. The drive electrodes COML are provided on the TFT substrate 21. The drive electrodes COML are electrodes for supplying the common voltage to a plurality of pixels Pix (described below). The drive electrodes COML function as a common drive electrode for liquid crystal display operation, and also function as the drive electrodes for touch detection operation. An insulating layer 23 is provided on the drive electrodes COML, and the pixel electrodes 22 are provided on the insulating layer 23. The pixel electrodes 22 are translucent electrodes for supplying the pixel signals for performing display. The drive electrodes COML and the pixel electrodes 22 include, for example, indium tin oxide (ITO).

The counter substrate 3 includes a glass substrate 31, a color filter 32, and touch detection electrodes TDL. The color filter 32 is provided on a first surface of the glass substrate 31. The color filter 32 is configured of, for example, color filter layers of three colors of red (R), green (G), and blue (B) arranged periodically, where a set of three colors R, G, and B is associated with each display pixel. The touch detection electrodes TDL are provided on a second surface of the glass substrate 31. The touch detection electrodes TDL, which are translucent, include for example, ITO. A polarizing plate 35 is disposed on the touch detection electrodes TDL The liquid crystal layer 6 acts as a display function layer that modulates light passing through the liquid crystal layer 6 depending on a state of an electric field. The electric field is formed by a difference in electric potential between the voltage of the drive electrode COML and the voltage of the pixel electrode 22. A transverse-mode liquid crystal, such as fringe field switching (FFS) liquid crystal and in-plane switching (IPS) liquid crystal, is used for the liquid crystal layer 6.

It is to be noted that an alignment film is provided between the liquid crystal layer 6 and the pixel substrate 2 and between the liquid crystal layer 6 and the counter substrate 3, and an incidence-side polarizing plate is disposed on a bottom of the pixel substrate 2, which are omitted to be shown herein.

Figure 7:
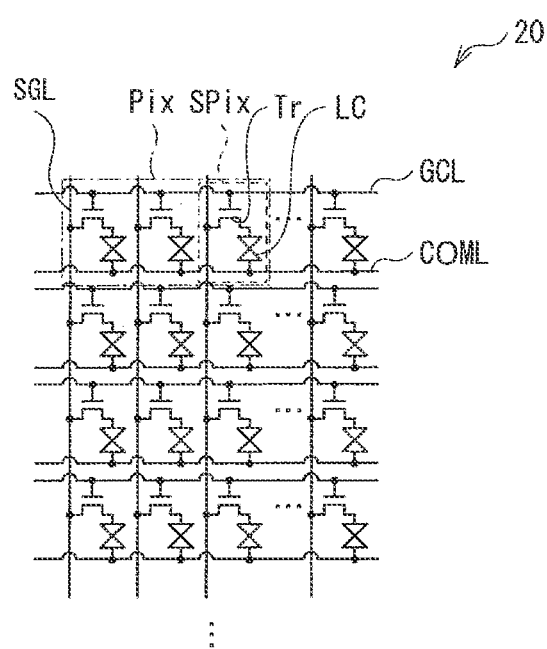
FIG. 7 is a circuit diagram illustrating a pixel arrangement in the display device with a touch detection function shown in FIG. 4.

FIG. 7 illustrates an exemplary configuration of a pixel structure of the liquid crystal display device 20. The liquid crystal display device 20 has a plurality of pixels Pix arranged in a matrix. Each pixel Pix is configured of three sub-pixels SPix. The respective, three sub-pixels SPix are disposed in correspondence to the three colors (RGB) of the color filter 32 shown in FIG. 6. Each sub-pixel SPix includes a TFT element Tr and a liquid crystal element LC. The TFT element Tr is configured of a thin film transistor which is an n-channel metal oxide semiconductor (MOS) TFT herein. A source of the TFT element Tr is connected to the pixel signal line SGL, a gate thereof is connected to the scan signal line GCL, and a drain thereof is connected to a first end of the liquid crystal element LC. A first end of the liquid crystal element LC is connected to the drain of the TFT element Tr, and the second end thereof is connected to the drive electrode COML.

The sub-pixel SPix is connected mutually with other sub-pixels SPix on the same row of the liquid crystal display device 20 through the scan signal line GCL. The scan signal line GCL is connected to the gate driver 12 and is supplied with the scan signal Vscan from the gate driver 12. In addition, the sub-pixel SPix is connected mutually with other sub-pixels SPix on the same column of the liquid crystal display device 20 through the pixel signal line SGL. The pixel signal line SGL is connected to the selection switch section 14 and is supplied with the pixel signal Vpix from the selection switch section 14.

Furthermore, the sub-pixel SPix is connected mutually with other sub-pixels SPix on the same row of the liquid crystal display device 20 through the drive electrode COML. The drive electrode COML is connected to the drive electrode driver 16 and is supplied with the drive signal Vcom (DC drive signal VcomDC) from the drive electrode driver 16.

According to such a configuration, in the liquid crystal display device 20, the gate driver 12 drives the scan signal lines GCL to be line-sequentially scanned in a time-divisional manner, thereby one horizontal line is sequentially selected, and the source driver 13 and the selection switch section 14 supply the pixel signals Vpix to pixels Pix along the one horizontal line, so that display is performed by one horizontal line basis.

Figure 8:
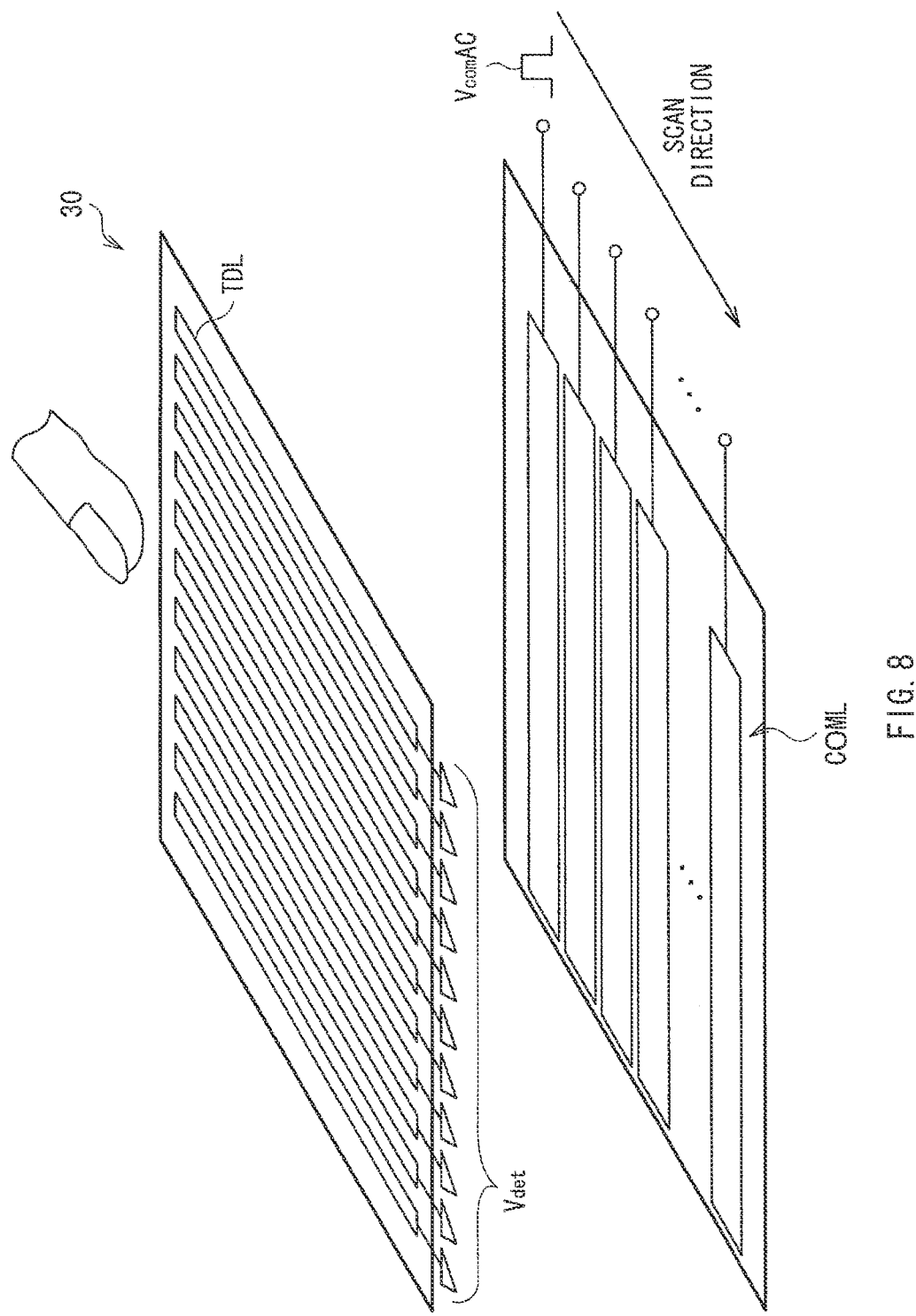
FIG. 8 is a perspective diagram illustrating exemplary configurations of drive electrodes and touch detection electrodes of the display device with a touch detection function shown in FIG. 4.

FIG. 8 perspectively illustrates an exemplary configuration of the touch detection device 30. The touch detection device 30 is configured of the drive electrodes COML provided on the pixel substrate 2 and the touch detection electrodes TDL provided on the counter substrate 3. The drive electrodes COML are configured as a plurality of stripe-shaped electrode patterns extending in a horizontal direction in the figure. In the touch detection operation, the AC drive signal VcomAC is sequentially supplied to each of the electrode patterns by the drive electrode driver 16 so that the electrode patterns are driven to be sequentially scanned in a time-divisional manner as described below. The touch detection electrodes TDL are configured of stripe-shaped electrode patterns extending in a direction orthogonal to the extending direction of the electrode patterns of the drive electrodes COML. The electrode pattern of each of the touch detection electrode TDL is connected to input parts of the LPF section 42 of the touch detection section 40. The electrode patterns of the drive electrode COML intersect the electrode patterns of the touch detection electrode TDL, resulting in formation of capacitance at respective intersections.

According to such a configuration, in the touch detection device 30, the drive electrode driver 16 applies the AC drive signal VcomAC to the drive electrodes COML, so that the touch detection electrodes TDL output the touch detection signal Vdet for touch detection. Specifically, the drive electrodes COML correspond to the drive electrode E1 in the basic principle of touch detection illustrated in FIGS. 1 to 3, and the touch detection electrodes TDL correspond to the touch detection electrode E2. The touch detection device 30 detects a touch event in accordance with the basic principle. As illustrated in FIG. 8, a capacitance-type touch sensor is formed in a matrix by the electrode patterns intersecting each other. Accordingly, a position of contact or proximity of an external proximity object is detected by scanning the entire touch detection surface of the touch detection device 30.

Figures 9A, 9B, 9C, 10:
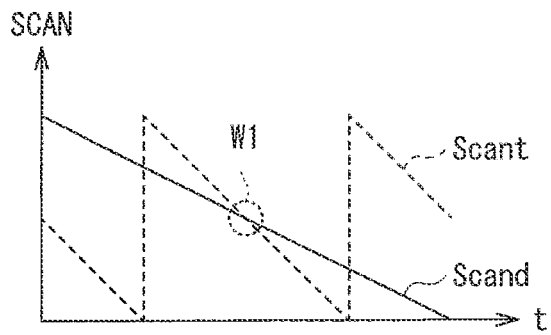
FIGS. 9A to 9C are schematic diagrams illustrating an exemplary operation of touch detection scan of the display panel with a touch detection function shown in FIG. 4.
FIG. 10 is a schematic diagram illustrating exemplary operations of display scan and touch detection scan of the display panel with a touch detection function shown in FIG. 4.

FIGS. 9A to 9C schematically illustrate touch detection scan. FIGS. 9A to 9C show application operation of the AC drive signal VcomAC to each of twenty drive electrode blocks B1 to B20 which define a display screen/touch detection surface herein. A drive-signal-applied block BAC indicates a drive electrode block B to which the AC drive signal VcomAC is applied, while the DC drive signal VcomDC is applied to other drive electrode blocks B. The drive electrode driver 16 sequentially selects a drive electrode block B as an object of touch detection operation and applies the AC drive signal VcomAC to the selected drive electrode block B so as to scan all the drive electrode blocks B, as shown in FIGS. 9A to 9C. During such operation, the drive electrode driver 16 applies the AC drive signal VcomAC to each drive electrode block B over a plurality of predetermined horizontal periods as described below. While the number of the drive electrode blocks B is twenty for convenience of description herein, this is not limitative.

FIG. 10 schematically illustrates display scan and touch detection scan. In the display panel with a touch detection function 1, the gate driver 12 drives the scan signal lines GCL to be line-sequentially scanned in a time-divisional manner so as to perform display scan Scand, and the drive electrode driver 16 sequentially selects the drive electrode block B to be driven so as to perform touch detection scan Scant. Here, the touch detection scan Scant is performed at a scan speed two times as high as the display scan Scand. In this way, in the display panel with a touch detection function 1, the scan speed of touch detection is higher than that of display scan, allowing a prompt response to a touch event due to an external proximity object, and leading to an improvement in response characteristics for touch detection. It is to be noted that the above scan is not limitative, and, for example, the touch detection scan Scant may be performed at a scan speed two times or more as high as the display scan Scand, or may be performed at a scan speed two times or less as high as the display scan Scand.

(Drive Signal Generation Section 15 and Drive Electrode Driver 16)

Figure 11:
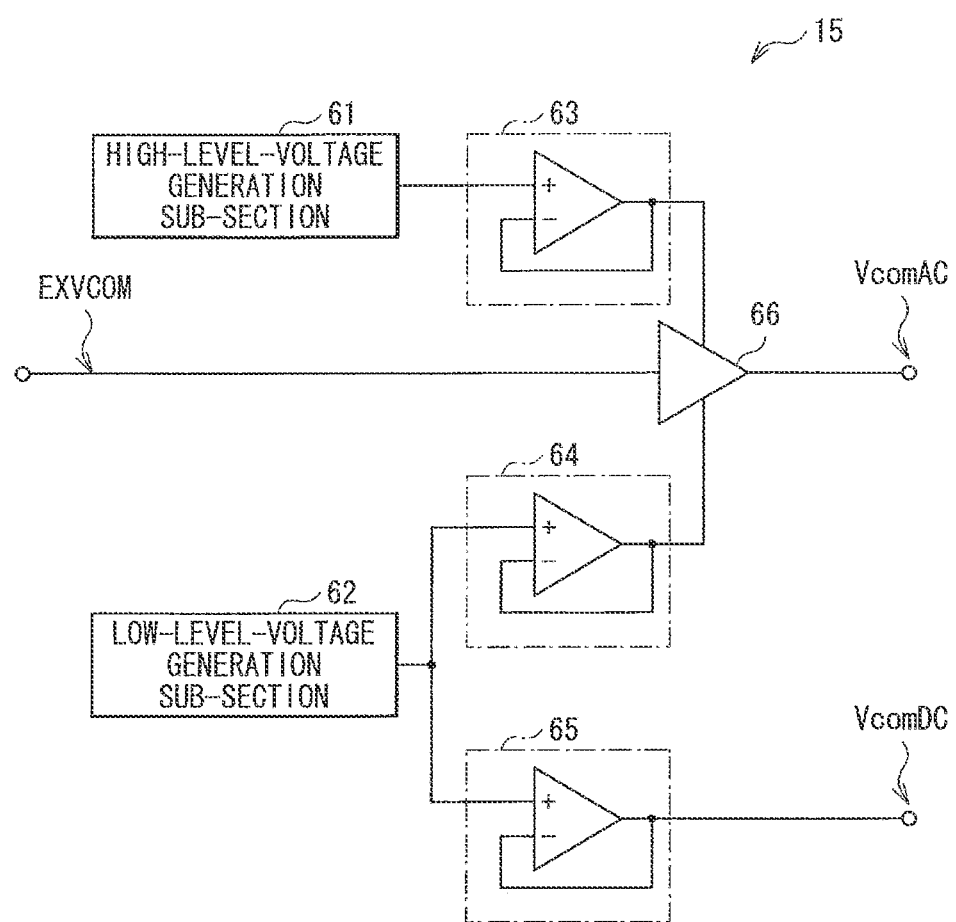
FIG. 11 is a block diagram illustrating an exemplary configuration of a drive signal generation section shown in FIG. 4.

FIG. 11 illustrates an exemplary configuration of the drive signal generation section 15. The drive signal generation section 15 includes a high-level-voltage generation sub-section 61, a low-level-voltage generation sub-section 62, buffers 63 to 65, and a switching circuit 66.

The high-level-voltage generation sub-section 61 generates a high-level voltage of the AC drive signal VcomAC. The low-level-voltage generation sub-section 62 generates a DC voltage of the DC drive signal VcomDC. The voltage generated by the low-level-voltage generation sub-section 62 is also used as a low-level voltage of the AC drive signal VcomAC. The buffer 63 outputs the voltage supplied from the high-level-voltage generation sub-section 61 to the switching circuit 66 while performing impedance conversion of the voltage. The buffer 64 outputs the voltage supplied from the low-level-voltage generation sub-section 62 to the switching circuit 66 while performing impedance conversion of the voltage. The switching circuit 66 generates the AC drive signal VcomAC based on the Vcom control signal EXVCOM. In detail, if the Vcom control signal EXVCOM is high, the switching circuit 66 outputs the voltage supplied from the buffer 63, and if the Vcom control signal EXVCOM is low, it outputs the voltage supplied from the buffer 64. The buffer 65 outputs the voltage supplied from the low-level-voltage generation sub-section 62 as the DC drive signal VcomDC while performing impedance conversion of the voltage. The buffers 63 to 65 are each configured of a voltage follower, for example.

Figure 12:
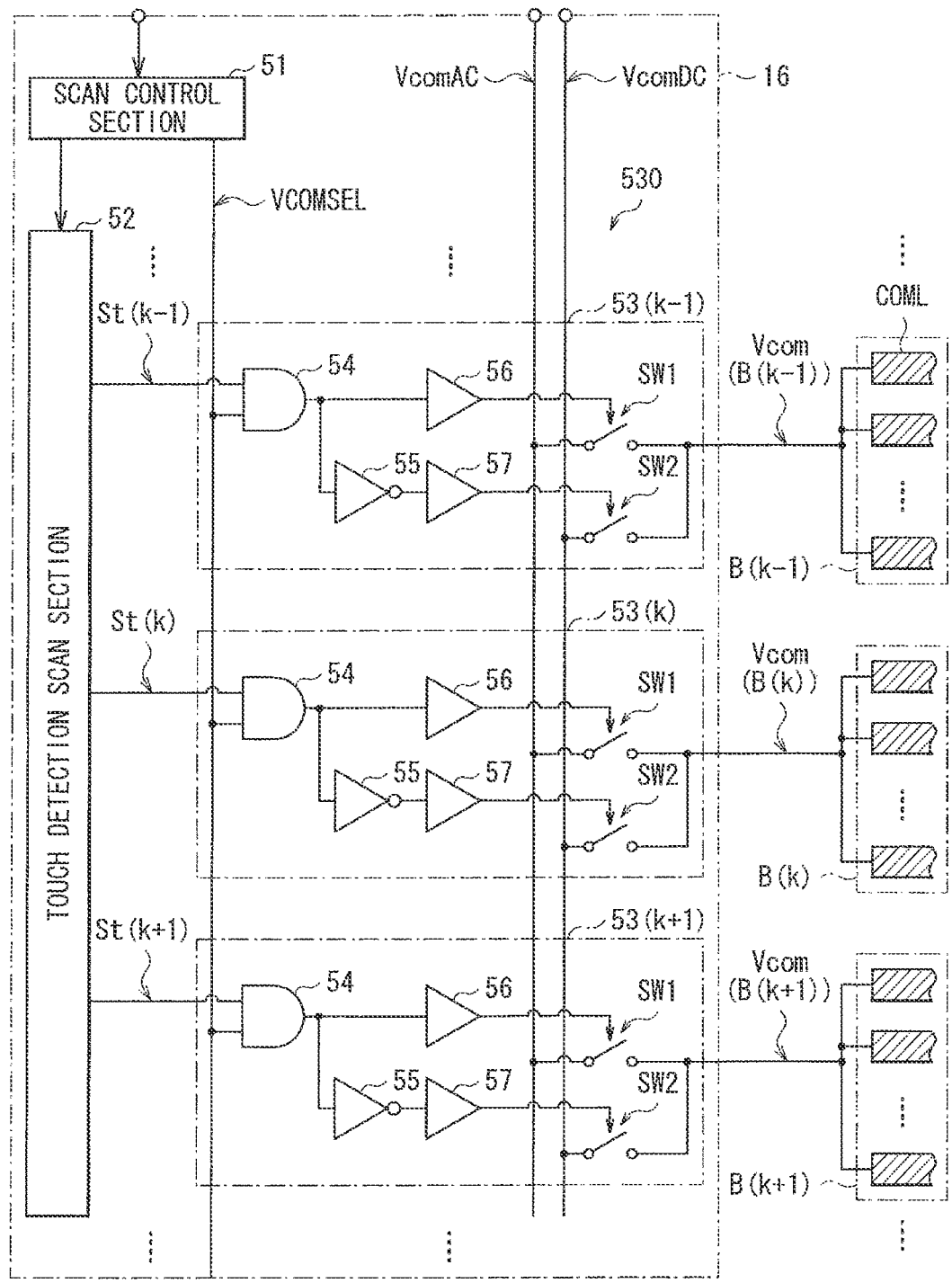
FIG. 12 is a block diagram illustrating an exemplary configuration of a drive electrode driver according to the first embodiment.

FIG. 12 illustrates an exemplary configuration of the drive electrode driver 16. The drive electrode driver 16 includes a scan control section 51, a touch detection scan section 52, and a drive section 530. The drive section 530 includes twenty drive sub-sections 53(1) to 53(20). Hereinafter, any one of the twenty drive sub-sections 53(1) to 53(20) is simply referred to as drive sub-section 53.

The scan control section 51 supplies a control signal to the touch detection scan section 52 based on a control signal supplied from the control section 11. In addition, the scan control section 51 has a function of supplying a Vcom selection signal VCOMSEL to the drive section 530. The Vcom selection signal VCOMSEL indicates appropriate one of the DC drive signal VcomDC and the AC drive signal VcomAC to be supplied to the drive electrodes COML.

The touch detection scan section 52 includes a shift register, and generates scan signals St for selecting the drive electrodes COML to which the AC drive signal VcomAC is applied. In detail, the touch detection scan section 52 generates a plurality of scan signals St corresponding to the drive electrode blocks B based on the control signal supplied from the scan control section 51, as described below. In the case where the touch detection scan section 52 supplies a high-level signal to a kth drive sub-section 53(k) as a kth scan signal St(k), for example, the drive sub-section 53(k) applies the AC drive signal VcomAC to a plurality of drive electrodes COML in a kth drive electrode block B(k).

The drive section 530 applies the DC drive signal VcomDC or the AC drive signal VcomAC supplied from the drive signal generation section 15 to the drive electrodes COML based on the scan signal St supplied from the touch detection scan section 52 and the Vcom selection signal VCOMSEL supplied from the scan control section 51. The drive sub-section 53 is provided by one in correspondence to each of the signals output from the touch detection scan section 52 so as to apply the drive signal Vcom to a corresponding drive electrode block B.

The drive sub-section 53 includes an AND gate 54, an inverter 55, buffers 56 and 57, and switches SW1 and SW2. The AND gate 54 generates a logical product (AND) of the scan signal St supplied from the touch detection scan section 52 and the Vcom selection signal VCOMSEL supplied from the scan control section 51, and outputs the logical product. The inverter 55 generates an inverting logic of the signal output from the AND gate 54 and outputs the inverting logic. The buffer 56 has a function of amplifying the signal supplied from the AND gate 54 to an amplitude level allowing on/off control of the switch SW1. The switch SW1 is controlled to be on or off based on the signal supplied from the buffer 56, and has a first end to which the AC drive signal VcomAC is supplied, and a second end connected to the plurality of drive electrodes COML defining the drive electrode block B. The buffer 57 has a function of amplifying the signal supplied from the inverter 55 to an amplitude level allowing on/off control of the switch SW2. The switch SW2 is controlled to be on or off based on the signal supplied from the buffer 57, and has a first end to which the DC drive signal VcomDC is supplied, and a second end connected to the second end of the switch SW1.

According to such a configuration, if the scan signal St is high, the drive sub-section 53 outputs the AC drive signal VcomAC as the drive signal Vcom while the Vcom selection signal VCOMSEL is high, and outputs the DC drive signal VcomDC as the drive signal Vcom while the Vcom selection signal VCOMSEL is low. If the scan signal St is low, the drive sub-section 53 outputs the DC drive signal VcomDC as the drive signal Vcom. The drive signal Vcom output from the drive sub-section 53 in this way is supplied to a plurality of drive electrodes COML defining the drive electrode block B corresponding to the drive sub-section 53.

The liquid crystal element LC corresponds to a specific example of "display element" of the disclosure. The drive electrode driver 16 corresponds to a specific example of "drive section" of the disclosure. The high-level-voltage generation sub-section 61 and the buffer 63 correspond to a specific example of "first voltage generation sub-section" of the disclosure. The low-level-voltage generation sub-section 62 corresponds to a specific example of "second voltage generation sub-section" of the disclosure. The buffer 64 corresponds to a specific example of "buffer circuit" of the disclosure.

[Operations and Functions]

Operations and functions of the display panel with a touch detection function 1 according to the embodiment are now described.

(Summary of General Operation)

Summary of general operation of the display panel with a touch detection function 1 is described with reference to FIG. 4. The control section 11 supplies the control signal to each of the gate driver 12, the source driver 13, the drive signal generation section 15, the drive electrode driver 16, and the touch detection section 40 based on a video signal Vdisp supplied from the outside, and thus controls those to operate in synchronization with one another. The gate driver 12 supplies the scan signals Vscan to the liquid crystal display device 20 to sequentially select one horizontal line as a display drive object. The source driver 13 generates the pixel signal Vsig with the pixel signals Vpix multiplexed and the switching control signal Vsel corresponding to the pixel signal Vsig, and supplies the generated signals to the selection switch section 14. The selection switch section 14 demultiplexes the pixel signals Vpix based on the pixel signal Vsig and the switching control signal Vsel, and supplies the pixel signals Vpix to the respective pixels Pix defining the one horizontal line. The drive signal generation section 15 generates the DC drive signal VcomDC and the AC drive signal VcomAC. The drive electrode driver 16 sequentially applies the AC drive signal VcomAC to the drive electrode blocks B while applying the DC drive signal VcomDC to the drive electrodes COML to which the AC drive signal VcomAC is not applied. The display device with a touch detection function 10 performs display operation while performing touch detection operation so that the touch detection electrodes TDL output the touch detection signal Vdet. The LPF section 42 removes high frequency components (noise components) contained in the touch detection signal Vdet to extract touch components for output. The A/D conversion section 43 converts the analog signals output from the LPF section 42 into digital signals. The signal processing section 44 detects presence of a touch event to the display device with a touch detection function 10 based on the signals output from the A/D conversion section 43. Upon detection of a touch event by the signal processing section 44, the coordinate extraction section 45 determines the touch-panel coordinates of the touch event. The detection timing control section 46 controls the LPF section 42, the A/D conversion section 43, the signal processing section 44, and the coordinate extraction section 45 to operate in synchronization with one another.

(Detailed Operation)

Detailed operation of the display panel with a touch detection function 1 is now described.

Figure 13:
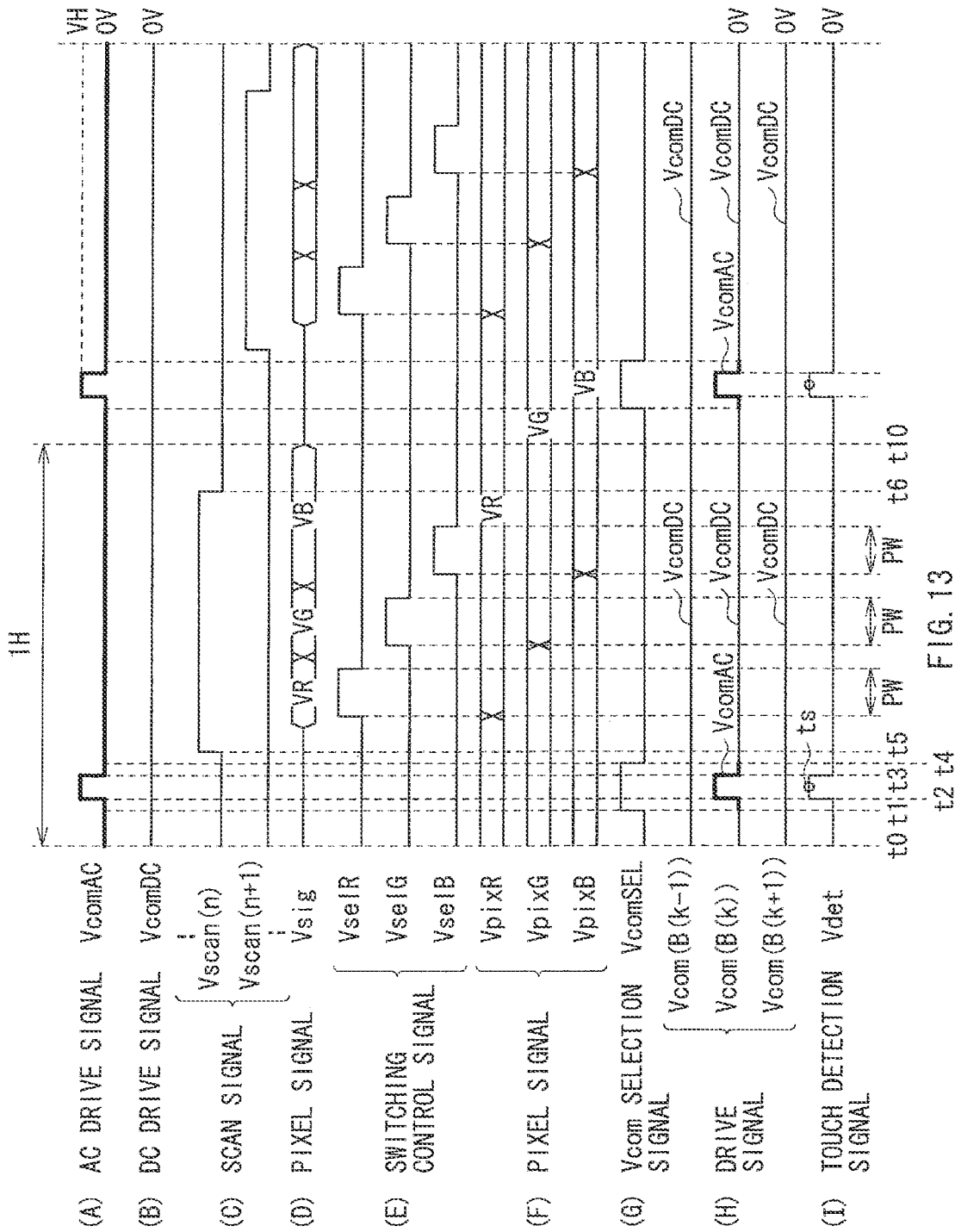
FIG. 13 is a timing waveform chart illustrating an exemplary operation of the display panel with a touch detection function according to the first embodiment.

FIG. 13 illustrates an exemplary timing waveform of the display panel with a touch detection function 1, where (A) illustrates a waveform of the AC drive signal VcomAC, (B) illustrates a waveform of the DC drive signal VcomDC, (C) illustrates waveforms of the scan signal Vscan, (D) illustrates a waveform of the pixel signal Vsig, (E) illustrates waveforms of the switching control signal Vsel, (F) illustrates waveforms of the pixel signal Vpix, (G) illustrates a waveform of the Vcom selection signal VCOMSEL, (H) illustrates waveforms of the drive signal Vcom, and (I) illustrates a waveform of the touch detection signal Vdet.

The display panel with a touch detection function 1 performs the display operation and the touch detection operation during each horizontal period (1H). In the display operation, the gate driver 12 sequentially applies the scan signal Vscan to the scan signal lines GCL to perform display scan. In the touch detection operation, the drive electrode driver 16 sequentially applies the AC drive signal VcomAC to the drive electrode blocks B by one at a time to perform touch detection scan, and the touch detection section 40 detects a touch event based on the touch detection signal Vdet output from the touch detection electrodes TDL. These are described in detail below.

After start of one horizontal period (1H) at timing t0, the scan control section 51 of the drive electrode driver 16 changes the voltage of the Vcom selection signal VCOMSEL from the low level to the high level at timing t1 ((G) of FIG. 13). As a result, in the drive electrode driver 16, the switch SW1 is turned on while the switch SW2 is turned off in a kth drive sub-section 53(k) relevant to the touch detection operation, so that the AC drive signal VcomAC ((A) of FIG. 13) generated by the drive signal generation section 15 is applied as a drive signal Vcom(B(k)) to the drive electrodes COML defining the corresponding kth drive electrode block B(k) through the switch SW1 ((H) of FIG. 13). In each of the drive sub-sections 53 other than the kth drive sub-section 53(k), the switch SW1 is turned off while the switch SW2 is turned on, so that the DC drive signal VcomDC ((B) of FIG. 13) generated by the drive signal generation section 15 is applied to the drive electrodes COML defining the corresponding drive electrode block B through the switch SW2 ((H) of FIG. 13).

The drive signal generation section 15 then changes the voltage of the AC drive signal VcomAC from the low level to the high level at timing t2 ((A) of FIG. 13). In detail, in the drive signal generation section 15, the buffer 63 supplies a current through the switching circuit 66 based on the Vcom control signal EXVCOM, so that the voltage of the AC drive signal VcomAC is changed from the low level to the high level. Along with this, the drive signal Vcom (B(k)) applied to the kth drive electrode block B(k) is also changed from the low level to the high level ((H) of FIG. 13). The drive signal Vcom (B(k)) is transmitted to the touch detection electrodes TDL through capacitance, so that the voltage of the touch detection signal Vdet is changed ((I) of FIG. 13).

The A/D conversion section 43 of the touch detection section 40 then performs A/D conversion of the signals output from the LPF section 42 which has received the touch detection signal Vdet, at a sampling timing ts ((I) of FIG. 13). The signal processing section 44 of the touch detection section 40 detects a touch event based on the A/D conversion results collected over a plurality of horizontal periods as described below.

The drive signal generation section 15 then changes the voltage of the AC drive signal VcomAC from the high level to the low level at timing t3 ((A) of FIG. 13). In detail, in the drive signal generation section 15, the buffer 64 sinks the current through the switching circuit 66 based on the Vcom control signal EXVCOM, so that the voltage of the AC drive signal VcomAC is changed from the high level to the low level. Along with this, the drive signal Vcom (B(k)) applied to the kth drive electrode block B(k) is also changed from the high level to the low level ((H) of FIG. 13), so that the voltage of the touch detection signal Vdet is changed ((I) of FIG. 13).

Subsequently, the scan control section 51 of the drive electrode driver 16 changes the voltage of the Vcom selection signal VCOMSEL from the high level to the low level at timing t4 ((G) of FIG. 13). As a result, in the drive electrode driver 16, the switch SW1 is turned off while the switch SW2 is turned on in the drive sub-section 53(k), so that the DC drive signal VcomDC ((B) of FIG. 13) generated by the drive signal generation section 15 is applied as the drive signal Vcom(B(k)) to the drive electrodes COML defining the corresponding drive electrode block B(k) through the switch SW2 ((H) of FIG. 13).

The gate driver 12 applies the scan signal Vscan to an nth scan signal line GCL(n) relevant to display operation at timing t5, so that the voltage of the scan signal Vscan is changed from the low level to the high level ((C) of FIG. 13). In addition, the source driver 13 and the selection switch section 14 apply the pixel signals Vpix to the pixel signal lines SGL ((F) of FIG. 13) for display of pixels Pix on one horizontal line corresponding to the nth scan signal line GCL(n).

In detail, the gate driver 12 changes the scan signal Vscan from the low level to the high level at timing t5 to select one horizontal line relevant to the display operation. In addition, the source driver 13 supplies a pixel voltage VR for a red sub-pixel SPix as a pixel signal Vsig to the selection switch section 14 ((D) of FIG. 13), and generates a switching control signal VselR that is high during a period of supplying the pixel voltage VR, and supplies the switching control signal VselR to the selection switch section 14 ((E) of FIG. 13). The selection switch section 14 allows a switch SWR to be on in a period where the switching control signal VselR is high (write period PW) to separate the pixel voltage VR supplied from the source driver 13 from the pixel signal Vsig, and supplies the pixel voltage VR as a pixel signal VpixR to the red sub-pixels SPix on one horizontal line through the pixel signal line SGL ((F) of FIG. 13). It is to be noted that after the switch SWR is turned off, the pixel signal line SGL is floated and thus the voltage of the pixel signal line SGL is maintained ((F) of FIG. 13). Similarly, the source driver 13 supplies a pixel voltage VG for a green sub-pixel SPix together with a corresponding switching control signal VselG to the selection switch section 14 ((D) and (E) of FIG. 13). The selection switch section 14 demultiplexes the pixel voltage VG from the pixel signal Vsig based on the switching control signal VselG, and supplies the pixel voltage VG as a pixel signal VpixG to the green sub-pixels SPix on one horizontal line through the pixel signal line SGL ((F) of FIG. 13). Similarly, the source driver 13 then supplies a pixel voltage VB for a blue sub-pixel SPix together with a corresponding switching control signal VselB to the selection switch section 14 ((D) and (E) of FIG. 13). The selection switch section 14 demultiplexes the pixel voltage VB from the pixel signal Vsig based on the switching control signal VselB, and supplies the pixel voltage VB as a pixel signal VpixB to the blue sub-pixels SPix on one horizontal line through the pixel signal line SGL ((F) of FIG. 13).

Next, the gate driver 12 changes the scan signal Vscan(n) of the scan signal line GCL (n) in the nth row from the high level to the low level at timing t6 ((C) of FIG. 13). As a result, the sub-pixels SPix on the one horizontal line relevant to display operation are electrically separated from the pixel signal lines SGL.

Then, one horizontal period is finished and a subsequent horizontal period is started at timing t10.

After that, the above operation is repeated, thereby the display panel with a touch detection function 1 performs display operation over the entire display surface through line-sequential scan, and performs touch detection operation over the entire touch-detection surface through scanning the drive electrode blocks B by one at a time.

Figure 14:
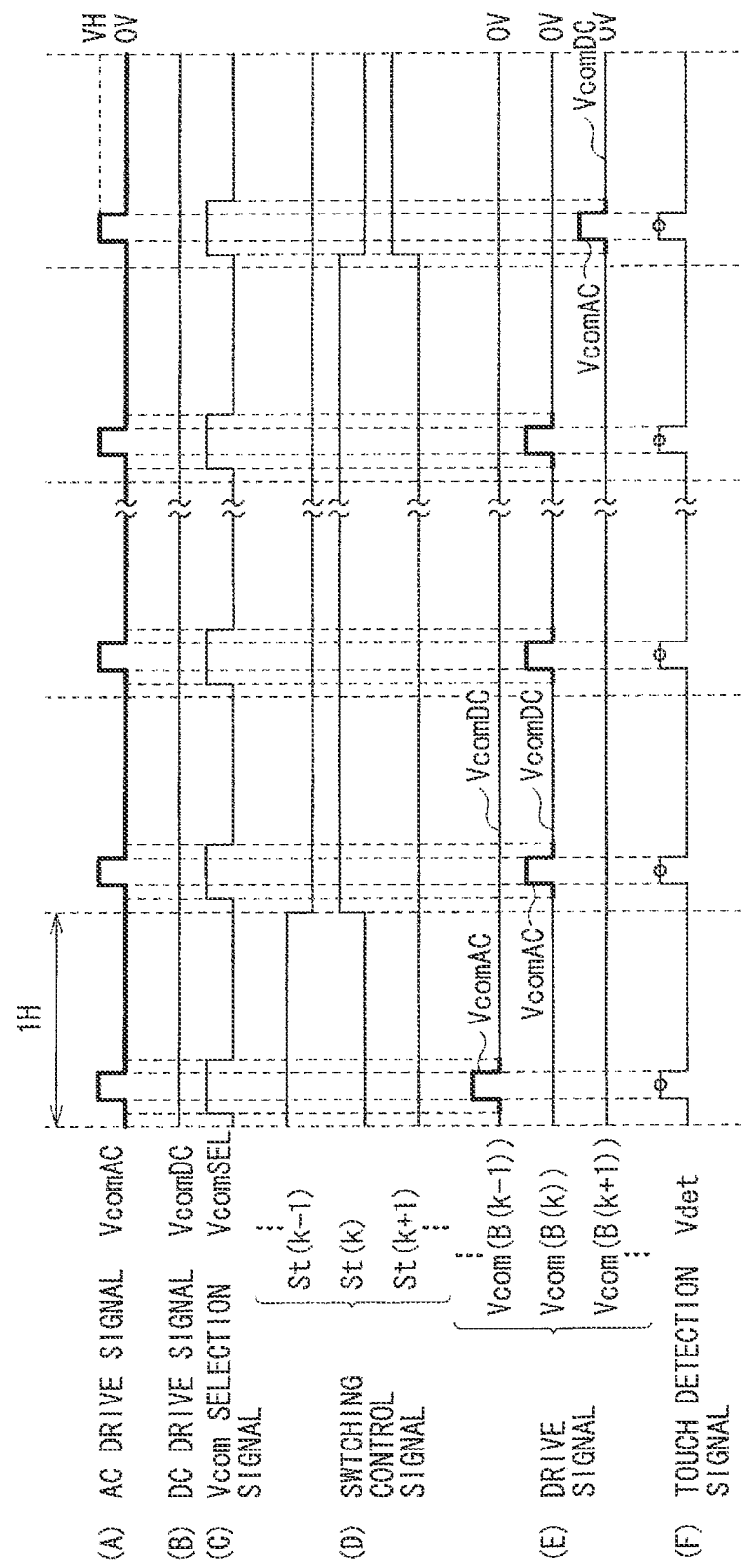
FIG. 14 is a timing waveform chart illustrating an exemplary touch detection operation of the display panel with a touch detection function according to the first embodiment.

FIG. 14 illustrates an exemplary operation of the touch detection scan, where (A) illustrates a waveform of the AC drive signal VcomAC, (B) illustrates a waveform of the DC drive signal VcomDC, (C) illustrates a waveform of the Vcom selection signal VCOMSEL, (D) illustrates waveforms of the scan signal St, (E) illustrates waveforms of the drive signal Vcom, and (F) illustrates a waveform of the touch detection signal Vdet.

As shown in FIG. 14, the drive electrode driver 16 sequentially applies the AC drive signal VcomAC to the corresponding drive electrode block B ((E) of FIG. 14) based on the scan signal St ((D) of FIG. 14) generated by the touch detection scan section 52 to perform touch detection scan. During this, the drive electrode driver 16 applies the AC drive signal VcomAC to each of the drive electrode blocks B over a plurality of predetermined horizontal periods ((E) of FIG. 14). The touch detection section 40 samples the touch detection signal Vdet based on the AC drive signal VcomAC during each one horizontal period. After such sampling is finished in the last horizontal period among the plurality of predetermined horizontal periods, the signal processing section 44 detects presence of a touch event in a region corresponding to the relevant drive electrode block B based on the plurality of sampling results. In this way, touch detection is performed based on the plurality of sampling results. As a result, the sampling results are statistically analyzed. This suppresses a reduction in an S/N ratio due to variations in the sampling results, leading to an improvement in accuracy of touch detection.

COMPARATIVE EXAMPLE

The functions of the display panel with a touch detection function 1 according to the embodiment are now described in comparison with a display panel with a touch detection function according to a comparative example. In the comparative example, a drive signal generation section generates high and low, two kinds of DC drive signals, and a drive electrode driver selects one of the two DC drive signals and applies the selected DC drive signal to drive electrodes COML. Other configurations are the same as in the embodiment (FIG. 4 and others).

Figure 15:
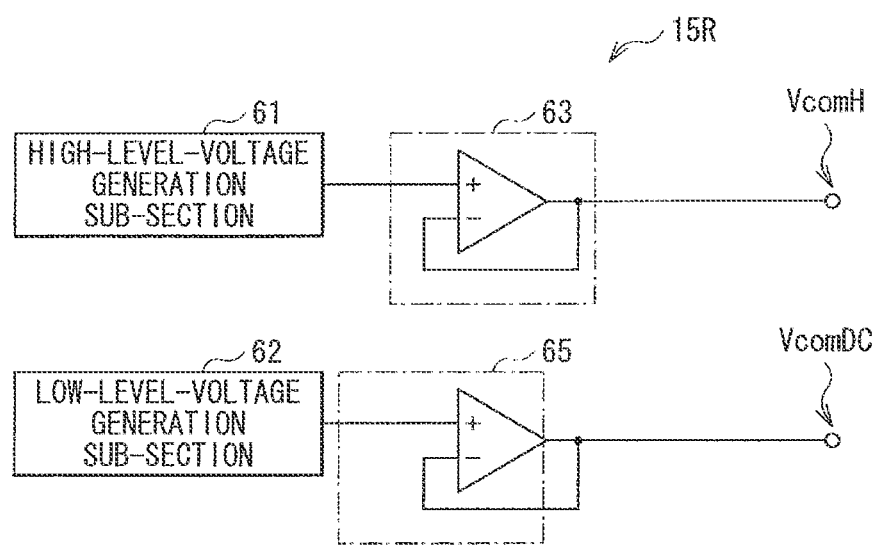
FIG. 15 is a block diagram illustrating an exemplary configuration of a drive signal generation section according to a comparative example.

FIG. 15 illustrates an exemplary configuration of a drive signal generation section 15R according to the comparative example. The drive signal generation section 15R generates two kinds of DC drive signals VcomH and VcomDC. The DC drive signal VcomH is generated by a high-level-voltage generation sub-section 61 and output through a buffer 63.

The DC drive signal VcomDC is generated by a low-level-voltage generation sub-section 62 and output through a buffer 65.

Figure 16:
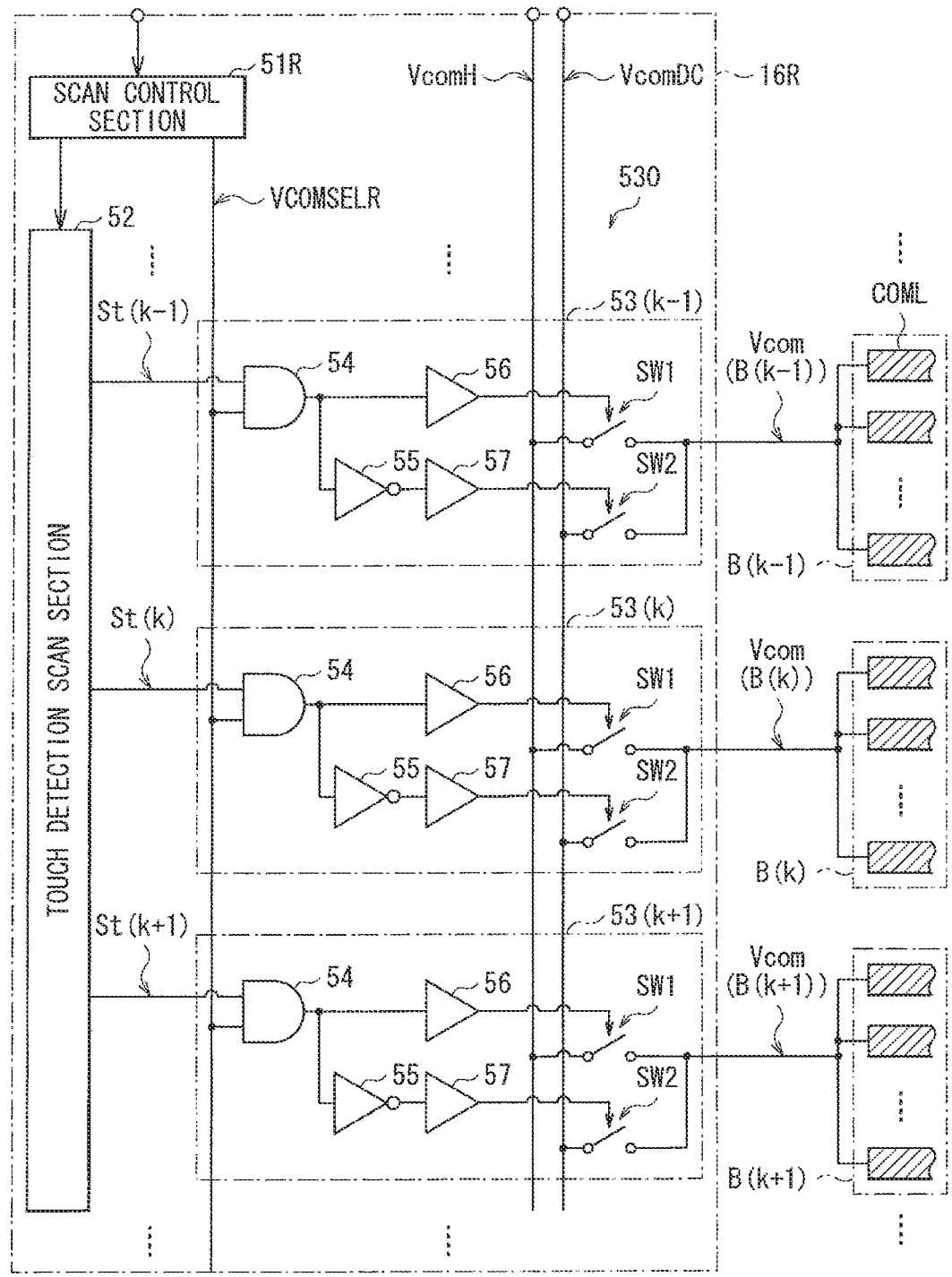
FIG. 16 is a block diagram illustrating an exemplary configuration of a drive electrode driver according to the comparative example.

FIG. 16 illustrates an exemplary configuration of a drive electrode driver 16R according to the comparative example. The drive electrode driver 16R includes a scan control section 51R. The scan control section 51R supplies a Vcom selection signal VCOMSELR to a drive section 530. The Vcom selection signal VCOMSELR indicates appropriate one of the two kinds of DC drive signals VcomH and VcomDC to be supplied to the drive electrodes COML.

The drive electrode driver 16R has switches SW1 each having one end to which the DC drive signal VcomH is supplied, as shown in FIG. 16. According to such a configuration, if a scan signal St is high, the drive sub-section 53 outputs the DC drive signal VcomH as a drive signal Vcom while the Vcom selection signal VCOMSELR is high, and outputs the DC drive signal VcomDC as the drive signal Vcom while the Vcom selection signal VCOMSELR is low.

Figure 17:
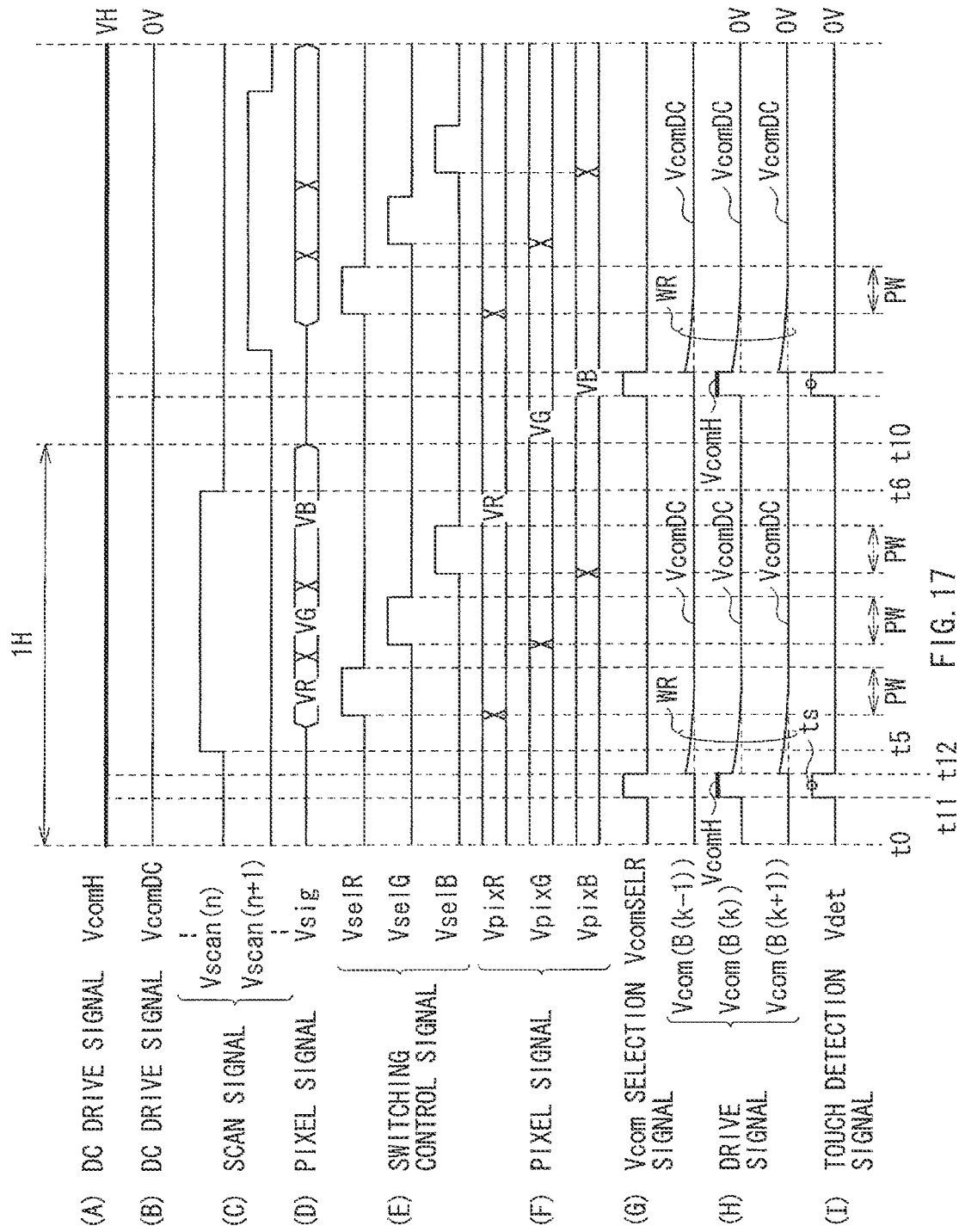
FIG. 17 is a timing waveform chart illustrating an exemplary operation of a display panel with a touch detection function according to the comparative example.

FIG. 17 illustrates an exemplary timing waveform of the display panel with a touch detection function according to the comparative example, where (A) illustrates a waveform of the DC drive signal VcomH, (B) illustrates a waveform of the DC drive signal VcomDC, (C) illustrates waveforms of a scan signal Vscan, (D) illustrates a waveform of a pixel signal Vsig, (E) illustrates waveforms of a switching control signal Vsel, (F) illustrates waveforms of a pixel signal Vpix, (G) illustrates a waveform of the Vcom selection signal VCOMSELR, (H) illustrates waveforms of a drive signal Vcom, and (I) illustrates a waveform of a touch detection signal Vdet.

The scan control section 51R of the drive electrode driver 16R changes the voltage of the Vcom selection signal VCOMSELR from the low level to the high level at timing t11 ((G) of FIG. 17). As a result, in the drive electrode driver 16, the switch SW1 is turned on while a switch SW2 is turned off in a kth drive sub-section 53(k) relevant to the touch detection operation, so that the DC drive signal VcomH ((A) of FIG. 17) generated by the drive signal generation section 15R is applied as a drive signal Vcom(B (k)) to the drive electrodes COML defining the corresponding kth drive electrode block B(k) through the switch SW1 ((H) of FIG. 17). In detail, the buffer 63 of the drive signal generation section 15R supplies a current to the drive electrodes COML, so that the drive signal Vcom(B(k)) is changed from the low level to the high level. In each of the drive sub-sections 53 other than the drive sub-section 53(k), the switch SW1 is turned off while the switch SW2 is turned on, so that the DC drive signal VcomDC ((B) of FIG. 17) generated by the drive signal generation section 15R is applied to the drive electrodes COML defining the corresponding drive electrode block B through the switch SW2 ((H) of FIG. 17). An A/D conversion section 43 of a touch detection section 40 then performs A/D conversion of the signals output from an LPF section 42 which has received the touch detection signal Vdet, at a sampling timing ts ((I) of FIG. 17).

The scan control section 51R of the drive electrode driver 16R changes the voltage of the Vcom selection signal VCOMSELR from the high level to the low level at timing t12 ((G) of FIG. 17). As a result, in the drive electrode driver 16R, the switch SW1 is turned off while the switch SW2 is turned on in the kth drive sub-section 53(k), so that the DC drive signal VcomDC ((B) of FIG. 17) generated by the drive signal generation section 15R is applied as the drive signal Vcom(B(k)) to the drive electrodes COML defining the corresponding drive electrode block B(k) through the switch SW2 ((H) of FIG. 17). In detail, the buffer 65 of the drive signal generation section 15R sinks the current from the drive electrodes COML, so that the voltage of the drive signal Vcom(B(k)) is changed from the high level to the low level.

At that time, the buffer 65 of the drive signal generation section 15R drives all the drive electrodes COML through the switches SW2 of the drive section 530 of the drive electrode driver 16R. Thus, the buffer 65 may not sufficiently drive the drive electrodes COML due to a large load. In such a case, at and after timing t2, electric charge, which has been accumulated in the drive electrodes COML of the drive electrode block B(k) during application of the DC drive signal VcomH, moves to other drive electrode blocks B through the switch SW2 of the drive sub-section 53(k), resulting in rising of the voltage of the drive signal Vcom (Vcom(B(k−1), Vcom(B(k), Vcom(B(k+1) and others) applied to the drive electrode blocks B (wavy portions WR). The buffer 65 sinks such electric charge, so that the voltage of the drive signal Vcom gradually converges to the voltage level of the DC drive signal VcomDC. If such converging time is long, nearly the write period PW, the pixel signal Vpix is insufficiently written into the pixels during the relevant write period PW, leading to a possibility of a reduction in image quality.

Contrarily, in the display panel with a touch detection function according to the embodiment, as shown in (H) of FIG. 13, the AC drive signal VcomAC is changed from the high level to the low level at timing t3, and then the switch SW1 is turned off while the switch SW2 is turned on at timing t4 in the drive sub-section 53(k), so that the drive signal supplied to the drive electrodes COML is switched from the AC drive signal VcomAC to the DC drive signal VcomDC.

As a result, in the drive signal generation section 15, the buffer 64, which is different from the buffer 65 generating the DC drive signal VcomDC, sinks the current at the timing when the AC drive signal VcomAC is changed from the high level to the low level at timing t3, and therefore the DC drive signal VcomDC is less affected by the AC drive signal VcomAC. Specifically, noise in the DC drive signal VcomDC, which is supplied to the horizontal line to which display operation is performed, is suppressed, thereby suppressing a reduction in image quality.

In addition, since the electric potential of the drive electrode block B(k) (the low-level voltage of the AC drive signal VcomAC) is substantially equal to the electric potential of other drive electrode blocks B(k) (the DC voltage of the DC drive signal VcomDC) immediately before the timing t4, substantially no electric charge moves after the switch SW2 is turned on at the timing t4. This reduces rising of the voltage of the drive signal Vcom (B(k)) as shown in the wavy portions WR in the comparative example, thereby suppressing a reduction in image quality.

[Effect]

As described before, in the embodiment, the AC drive signal and the DC drive signal are selectively applied to the drive electrodes to be driven, and the DC drive signal is switched from the AC drive signal after the AC drive signal is changed from the high level to the low level, thereby suppressing a reduction in image quality.

In addition, in the embodiment, the buffer for supplying the low level of the AC drive signal and the buffer for supplying the DC drive signal are separately provided, thereby suppressing a reduction in image quality.

[Modification 1-1]

Figure 18:
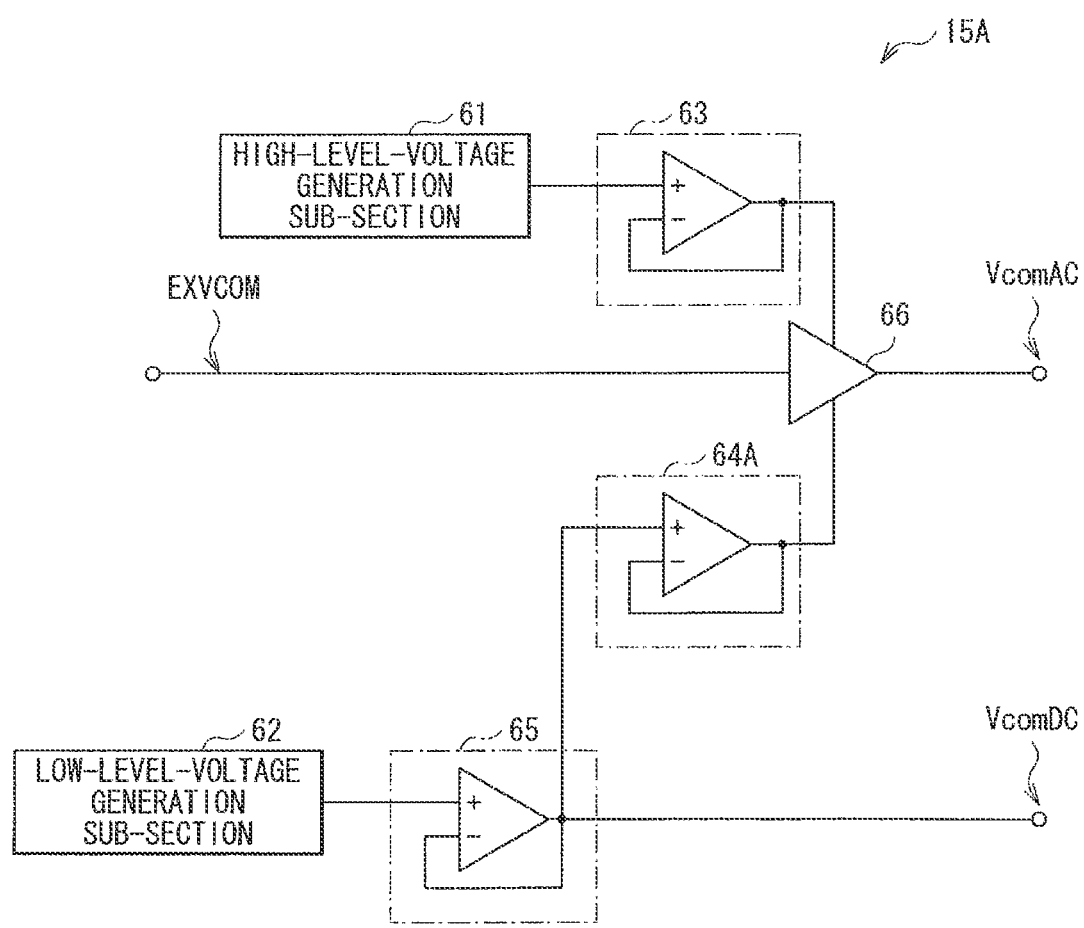
FIG. 18 is a block diagram illustrating an exemplary configuration of a drive signal generation section according to a modification of the embodiment.

While the drive signal generation section 15 is configured as shown in FIG. 11 in the first embodiment, this is not limitative. For example, a buffer 64A for generating the low level of the AC drive signal may receive the DC drive signal VcomDC, as shown in FIG. 18. The low-level-voltage generation sub-section 62 and the buffer 65 correspond to a specific example of "second voltage generation section" of the disclosure. The buffer 64A corresponds to a specific example of "buffer circuit" of the disclosure. In this case, the DC drive signal VcomDC is also less affected by the noise due to the AC drive signal VcomAC, thereby suppressing a reduction in image quality.

[Modification 1-2]

Figure 19:
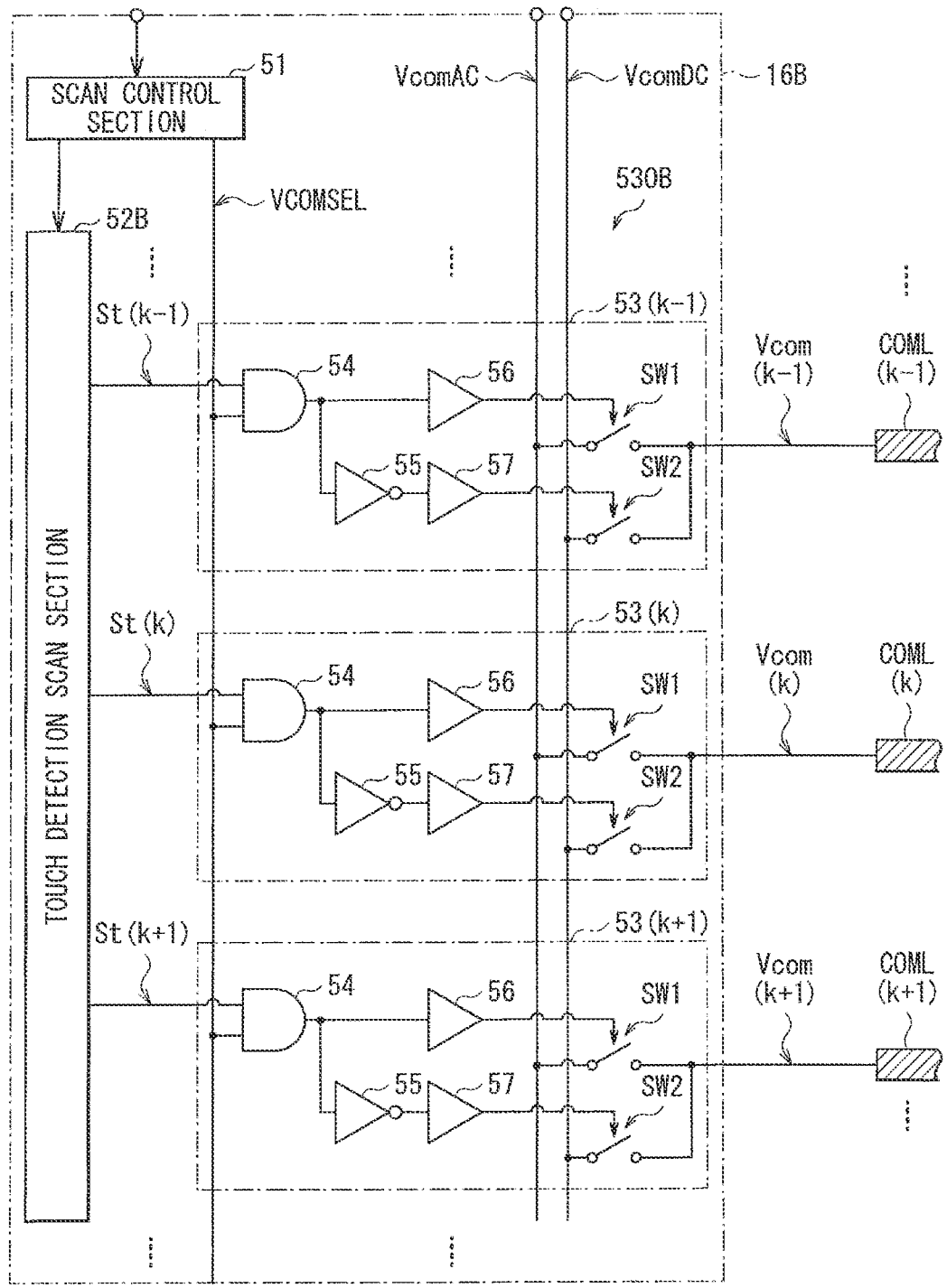
FIG. 19 is a block diagram illustrating an exemplary configuration of a drive electrode driver according to another modification of the embodiment.

While the drive electrode driver 16 drives the drive electrode blocks B, each including the predetermined number of drive electrodes COML, by one at a time in the first embodiment, this is not limitative. Instead, the drive electrode driver 16 may directly drive the drive electrodes COML by one at a time, for example, as shown in FIG. 19. In such a case, a drive section 530B includes the same number of drive sub-sections 53 as the total number of the drive electrodes COML, and a touch detection scan section 52B supplies the scan signals St to the drive section 530B.

[Modification 1-3]

While the drive electrodes COML are scanned to be driven by one drive-electrode-block B, which includes the predetermined number of drive electrodes COML, at a time, this is not limitative. Instead, for example, a predetermined number of drive electrodes COML may be simultaneously driven while the drive electrodes COML to be driven are shifted one by one to scan the drive electrodes COML. This is described in detail below.

Figure 20A:
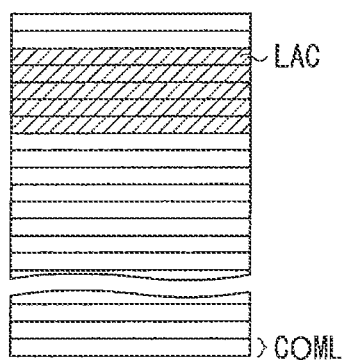
FIGS. 20A to 20C are schematic diagrams illustrating an exemplary operation of touch detection scan according to a still another modification of the embodiment.
Figure 20B:
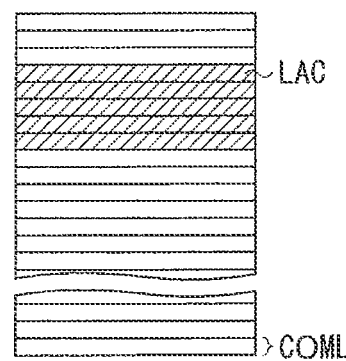
Figure 20C:
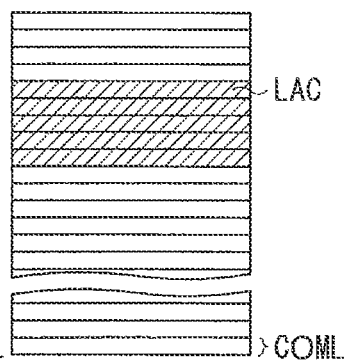

FIG. 20 schematically illustrates an exemplary operation of a drive electrode driver 16C according to the modification. The drive electrode driver 16C simultaneously applies the AC drive signal VcomAC to a predetermined number of drive electrodes COML. In detail, the drive electrode driver 16C simultaneously applies the AC drive signal VcomAC to the predetermined number (here, five) of drive electrodes COML (drive-signal-applied electrodes LAC). Then, the drive electrode driver 16C shifts the drive electrodes COML, to which the AC drive signal VcomAC is applied, one by one to perform touch detection scan. Such touch detection scan is achieved by, for example, using the drive electrode driver 16B shown in FIG. 19, where a shift register in the touch detection scan section 52B transmits a wide pulse. While the AC drive signal VcomAC is simultaneously applied to the five drive electrodes COML herein, this is not limitative. Instead, the AC drive signal VcomAC may be simultaneously applied to not more than four drive electrodes COML or not less than six drive electrodes COML. While the drive electrodes COML, to which the AC drive signal VcomAC is applied, are shifted one by one herein, this is not limitative. Instead, the drive electrodes COML may be shifted by two or more at a time.

[Modification 1-4]

Figure 21:
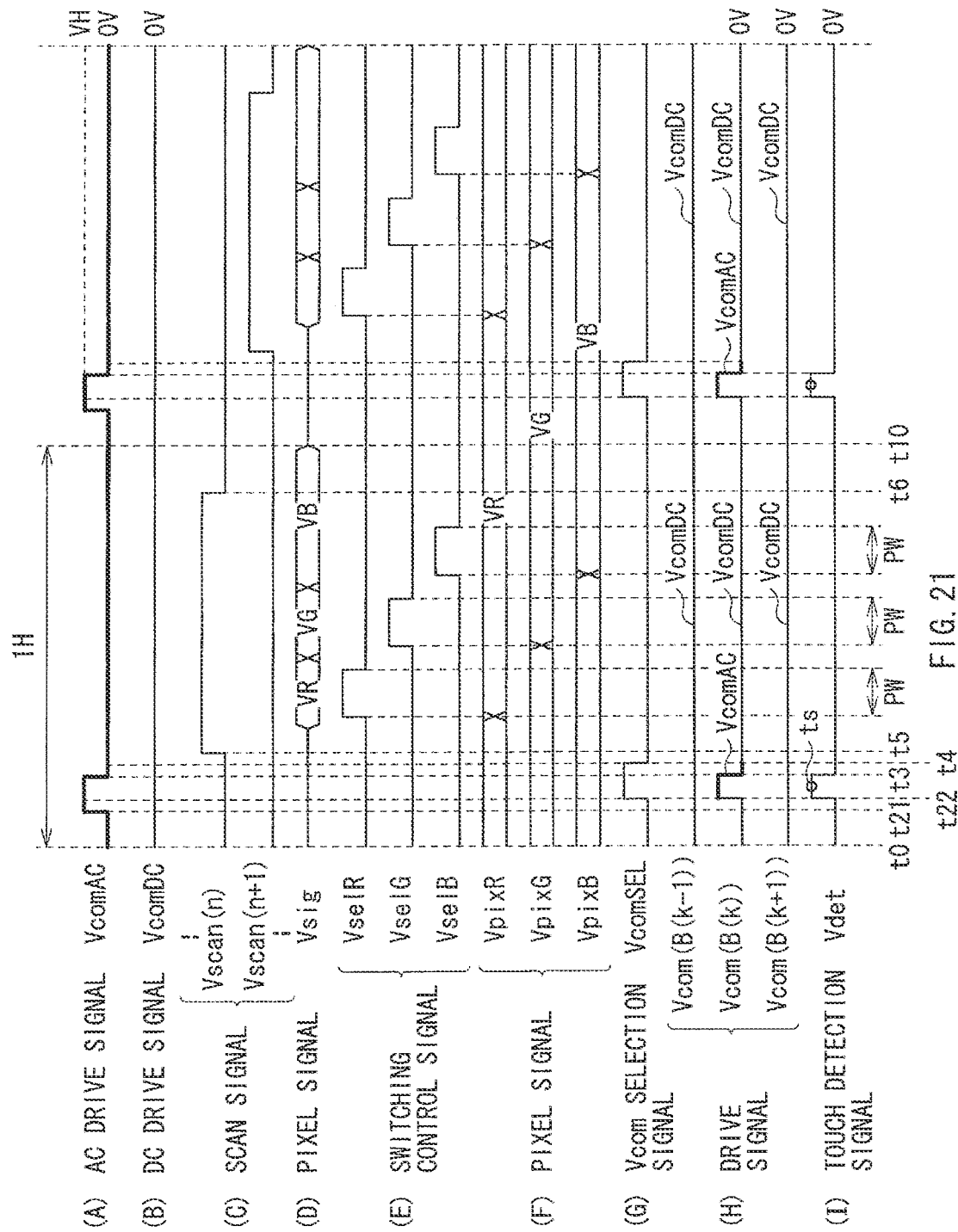
FIG. 21 is a timing waveform chart illustrating an exemplary operation of a display panel with a touch detection function according to a still another modification of the embodiment.

While the voltage of the AC drive signal VcomAC is changed from the low level to the high level at timing t2 after the voltage of the Vcom selection signal VCOMSEL is changed from the low level to the high level at timing t1 as shown in FIG. 13 in the first embodiment, this is not limitative. For example, the voltage of the Vcom selection signal VCOMSEL may be changed from the low level to the high level at timing t22 after the voltage of the AC drive signal VcomAC is changed from the low level to the high level at timing t21, as shown in FIG. 21.

3. SECOND EMBODIMENT

A display panel with a touch detection function 7 according to a second embodiment is now described. The second embodiment is different from the first embodiment in a selection process of the drive signal in the case where one of the DC drive signal VcomDC and the AC drive signal VcomAC is selected to be supplied to the drive electrodes COML. It is to be noted that substantially the same components as those of the display panel with a touch detection function 1 according to the first embodiment are designated by the same numerals, and description of them is appropriately omitted.

Figure 22:
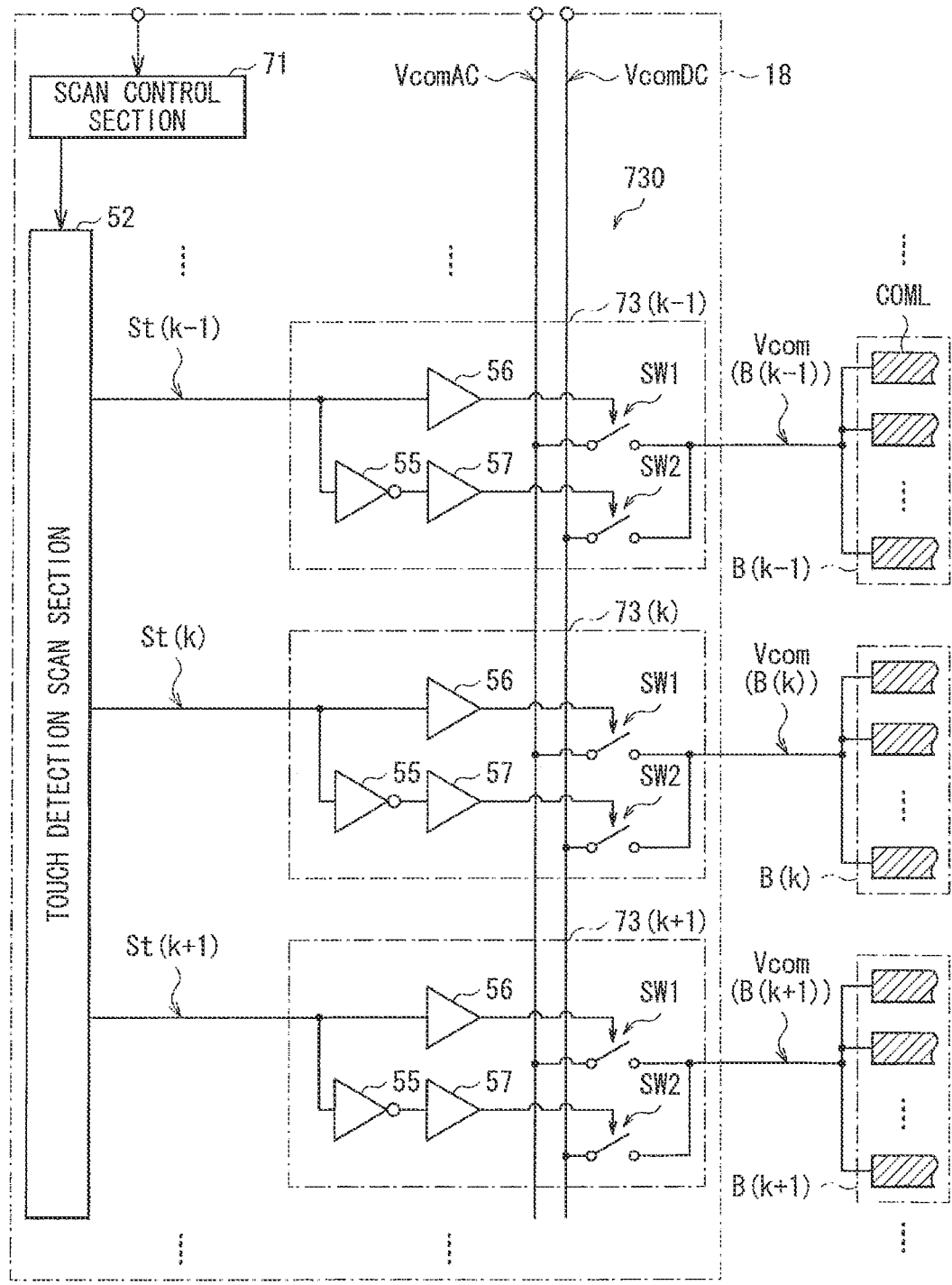
FIG. 22 is a block diagram illustrating an exemplary configuration of a drive electrode driver according to a second embodiment.

FIG. 22 illustrates an exemplary configuration of a drive electrode driver 18 of the display panel with a touch detection function 7. The drive electrode driver 18 includes a scan control section 71 and a drive section 730.

The scan control section 71 supplies a control signal to a touch detection scan section 52 based on a control signal supplied from a control section 11.

The drive section 730 applies a drive signal Vcom (a DC drive signal VcomDC or an AC drive signal VcomAC) to the drive electrodes COML based on a scan signal St supplied from the touch detection scan section 52. Each drive sub-section 73 includes an inverter 55, buffers 56 and 57, and switches SW1 and SW2. Specifically, the drive sub-section 73 does not include an AND gate 54 unlike the drive sub-section 53 in the first embodiment. According to such a configuration, the drive sub-section 73 outputs the AC drive signal VcomAC as the drive signal Vcom if the scan signal St is high, and outputs the DC drive signal VcomDC as the drive signal Vcom if the scan signal St is low.

Figure 23:
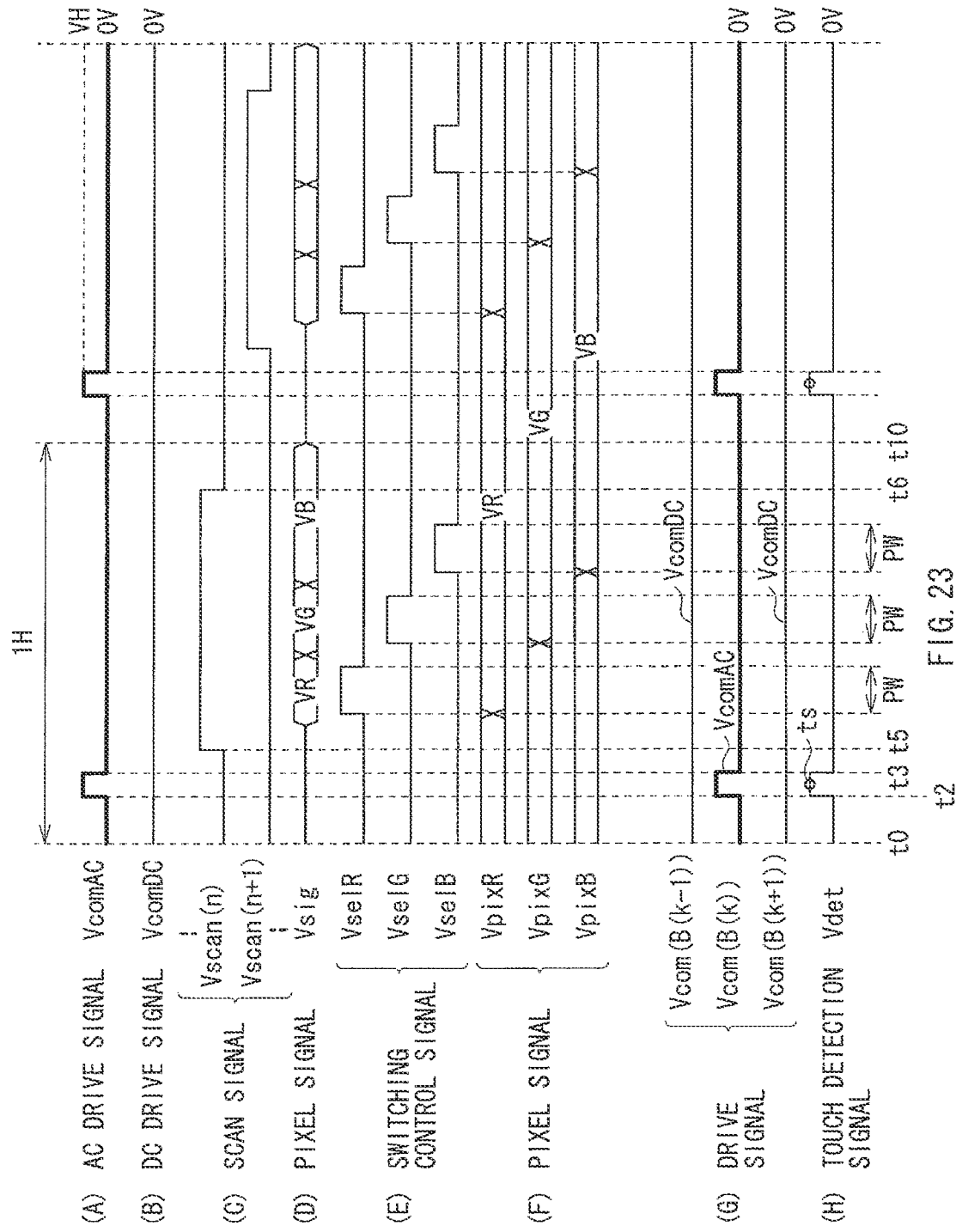
FIG. 23 is a timing waveform chart illustrating an exemplary operation of the display panel with a touch detection function according to the second embodiment.

FIG. 23 illustrates an exemplary timing waveform of the display panel with a touch detection function 7, where (A) illustrates a waveform of the AC drive signal VcomAC, (B) illustrates a waveform of the DC drive signal VcomDC, (C) illustrates waveforms of the scan signal Vscan, (D) illustrates a waveform of a pixel signal Vsig, (E) illustrates waveforms of a switching control signal Vsel, (F) illustrates waveforms of a pixel signal Vpix, (G) illustrates waveforms of the drive signal Vcom, and (H) illustrates a waveform of a touch detection signal Vdet.

Upon start of one horizontal period (1H) at timing t0, the drive electrode driver 18 supplies the AC drive signal VcomAC to the drive electrodes COML relevant to touch detection ((G) of FIG. 23). In detail, in the drive electrode driver 18, the switch SW1 is turned on while the switch SW2 is turned off in a kth drive sub-section 73(k) relevant to the touch detection operation, so that the AC drive signal VcomAC ((A) of FIG. 23) generated by the drive signal generation section 15 is applied as a drive signal Vcom(B(k)) to the drive electrodes COML defining the corresponding kth drive electrode block B(k) through the switch SW1 ((G) of FIG. 23).

The drive signal generation section 15 then changes the voltage of the AC drive signal VcomAC from the low level to the high level at timing t2 ((A) of FIG. 23). Along with this, the drive signal Vcom (B(k)) applied to the kth drive electrode block B(k) is changed from the low level to the high level ((G) of FIG. 23). The drive signal Vcom (B(k)) is transmitted to touch detection electrodes TDL through capacitance, so that the voltage of the touch detection signal Vdet is changed ((H) of FIG. 23). An A/D conversion section 43 of a touch detection section 40 then performs A/D conversion of the signals output from an LPF section 42 which has received the touch detection signal Vdet, at a sampling timing ts ((H) of FIG. 23). The drive signal generation section 15 then changes the voltage of the AC drive signal VcomAC from the high level to the low level at timing t3 ((A) of FIG. 23).

At and after timing t5, the display panel with a touch detection function 7 performs display operation as in the display panel with a touch detection function 1 according to the first embodiment. In the display panel with a touch detection function 7, the drive electrode driver 18 still applies the AC drive signal VcomAC as the drive signal Vcom(B(k)) to the drive electrodes COML relevant to the touch detection during a period of the display operation ((G) of FIG. 23).

Figure 24:
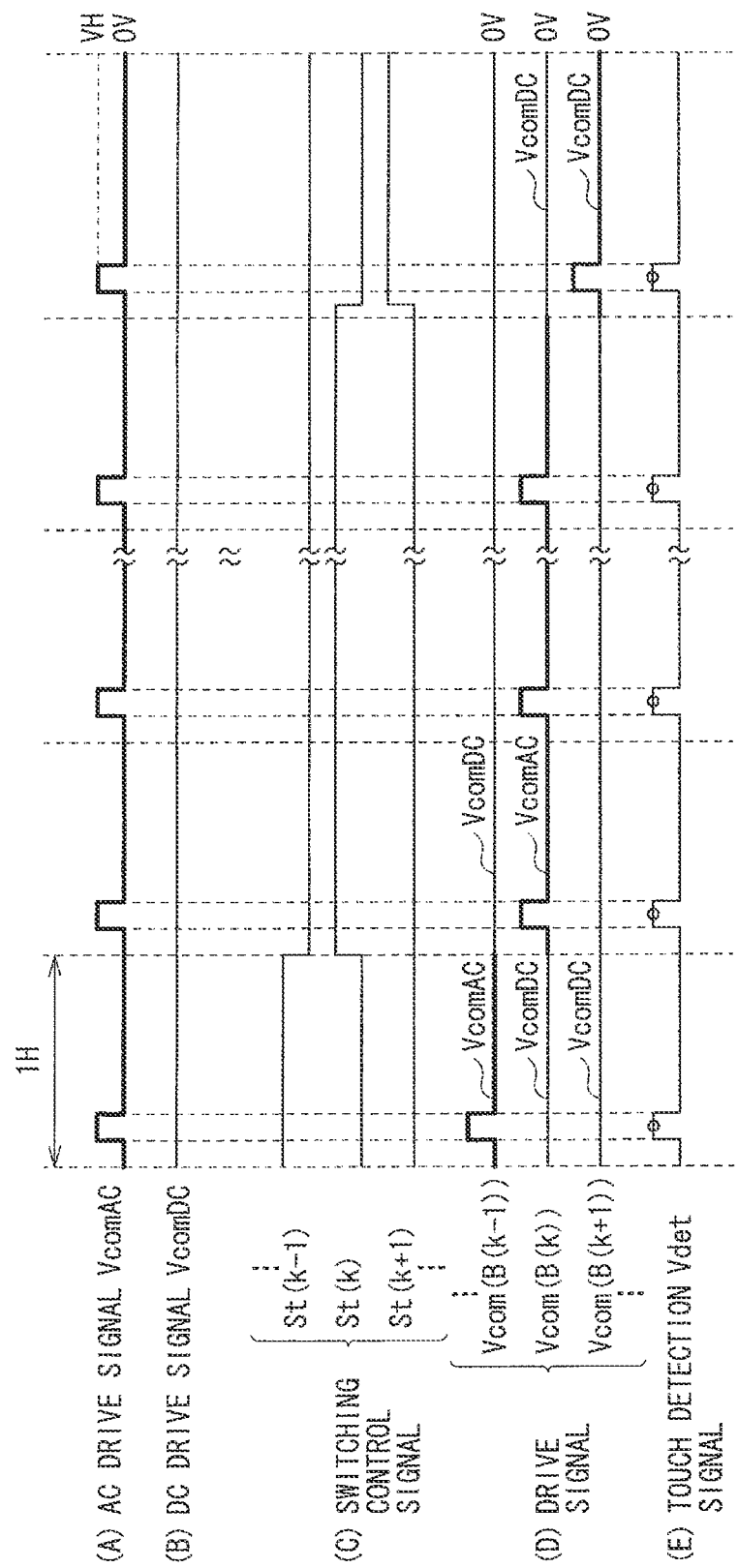
FIG. 24 is a timing waveform chart illustrating an exemplary touch detection operation of the display panel with a touch detection function according to the second embodiment.

FIG. 24 illustrates an exemplary operation of the touch detection scan of the display panel with a touch detection function 7, where (A) illustrates a waveform of the AC drive signal VcomAC, (B) illustrates a waveform of the DC drive signal VcomDC, (C) illustrates waveforms of the scan signal St, (D) illustrates waveforms of the drive signal Vcom, and (E) illustrates a waveform of the touch detection signal Vdet.

As shown in FIG. 24, the drive electrode driver 18 sequentially applies the AC drive signal VcomAC to the relevant drive electrode block B based on the scan signal St ((C) of FIG. 24) generated by the touch detection scan section 52 ((D) of FIG. 24) to perform touch detection scan. In this operation, the drive electrode driver 18 continuously supplies the AC drive signal VcomAC to the corresponding kth drive electrode block B(k) during a period where the kth scan signal St(k) is high, for example. Specifically, in the first embodiment, the AC drive signal VcomAC is applied only while the Vcom selection signal VCOMSEL is high in the period where the kth scan signal St(k) is high, as shown in (E) of FIG. 14. Contrarily, in the second embodiment, the AC drive signal VcomAC is continuously applied in the period where the kth scan signal St(k) is high, as shown in (D) of FIG. 24.

The AC drive signal VcomAC or the DC drive signal VcomDC is applied to the drive electrode COML along one horizontal line relevant to the display operation. In detail, in the case where the drive electrode COML along one horizontal line relevant to the display operation is not included in the drive detection block B relevant to touch detection operation, the DC drive signal VcomDC is applied to the drive electrode COML. Contrarily, the drive electrode COML along one horizontal line relevant to the display operation is included in the drive detection block B relevant to the touch detection operation at the timing W1 in FIG. 10. In such a case, the AC drive signal VcomAC is applied to the drive electrode COML. The DC voltage of the DC drive signal VcomDC and the low-level voltage of the AC drive signal VcomAC are generated by the low-level-voltage generation sub-section 62 of the drive signal generation section 15 as shown in FIG. 11 and thus have substantially the same voltage level. In this way, since the voltage of the drive electrode COML along one horizontal line relevant to the display operation is substantially the same between the case where the one horizontal line corresponds to the drive detection block B relevant to the touch detection operation and another case, substantially the same pixel signal is written during the write period PW, thereby suppressing a reduction in image quality.

It is to be noted that in the case where the DC voltage of the DC drive signal VcomDC is slightly different from the low-level voltage of the AC drive signal VcomAC due to a difference in performance between the buffers 64 and 65 (FIG. 11), the voltage is differently written into a pixel between the case where the DC drive signal VcomDC is supplied to the drive electrode COML along one horizontal line relevant to the display operation and the case where the AC drive signal VcomAC is supplied thereto, leading to a possibility of degradation in image quality. In such a case, the AC drive signal VcomAC is desirably applied to the drive electrode COML during periods other than the write period PW as in the display panel with a touch detection function 1 of the first embodiment.

As described above, in the second embodiment, the drive signal supplied to the drive electrode is selected only based on the scan signal St, which simplifies the configurations of the scan control section and the drive section. Other effects are the same as in the first embodiment.

[Modification 2]

In the second embodiment, the drive signal generation section 15 may be configured as shown in FIG. 18, for example, as in the modification 1-1 of the first embodiment. In addition, the drive electrode driver 18 may directly drive the drive electrodes COML by one at a time as in the modification 1-2 of the first embodiment. In addition, touch detection scan may be performed as shown in FIG. 20 as in the modification 1-3 of the first embodiment.

3. APPLICATION EXAMPLES

Next, application examples of each display panel with a touch detection function in the above-described embodiments and modifications are now described with reference to FIGS. 25 to 29G. The display panel with a touch detection function described in the embodiments and others is applicable to electronic units in various fields, including a television apparatus, a digital camera, a notebook personal computer, a mobile terminal device such as a mobile phone, and a video camera. In other words, the display panel with a touch detection function in the embodiments and others is applicable to electronic units in various fields for displaying externally-input or internally-generated video signals as still or video images.

Application Example 1

Figure 25:
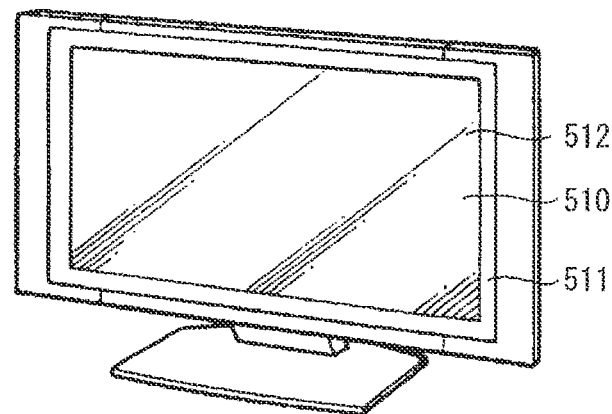
FIG. 25 is a perspective diagram illustrating an appearance configuration of an application example 1, among display panels with a touch detection function applied with the embodiments.

FIG. 25 shows appearance of a television apparatus applied with the display panel with a touch detection function according to the embodiments and others. The television apparatus has, for example, an image display screen section 510 including a front panel 511 and a filter glass 512. The image display screen section 510 is configured of the display panel with a touch detection function according to the embodiments and others.

Application Example 2

Figure 26A:
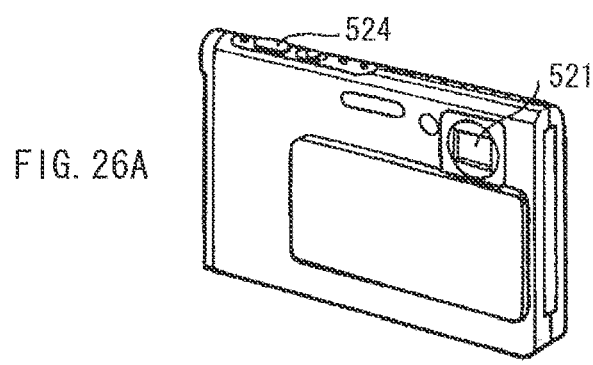
FIGS. 26A and 26B are perspective diagrams illustrating an appearance configuration of an application example 2.
Figure 26B:
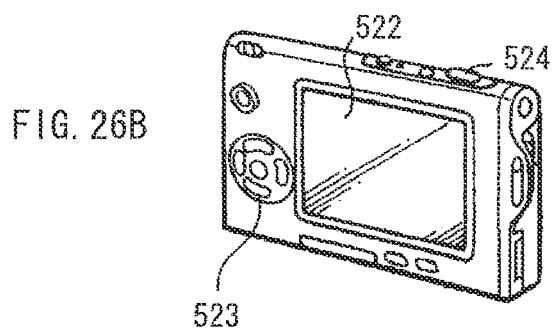

FIGS. 26A and 26B show appearance of a digital camera applied with the display panel with a touch detection function according to the embodiments and others. The digital camera has, for example, a light emitting section for flash 521, a display section 522, a menu switch 523, and a shutter button 524. The display section 522 is configured of the display panel with a touch detection function according to the embodiments and others.

Application Example 3

Figure 27:
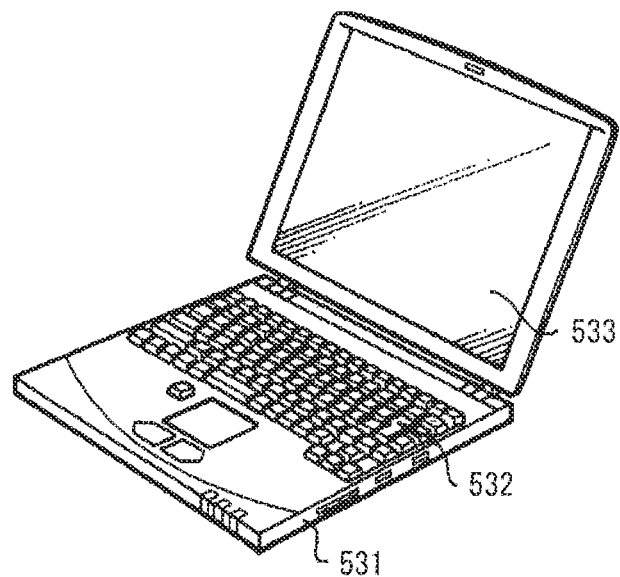
FIG. 27 is a perspective diagram illustrating an appearance configuration of an application example 3.

FIG. 27 shows appearance of a notebook personal computer applied with the display panel with a touch detection function according to the embodiments and others. The notebook personal computer has, for example, a main body 531, a keyboard 532 for input operation of letters and the like, and a display section 533 for displaying images. The display section 533 is configured of the display panel with a touch detection function according to the embodiments and others.

Application Example 4

Figure 28:
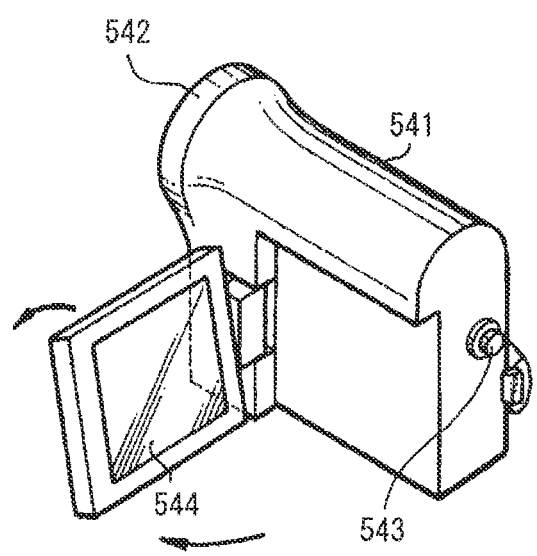
FIG. 28 is a perspective diagram illustrating an appearance configuration of an application example 4.
Figure 29:
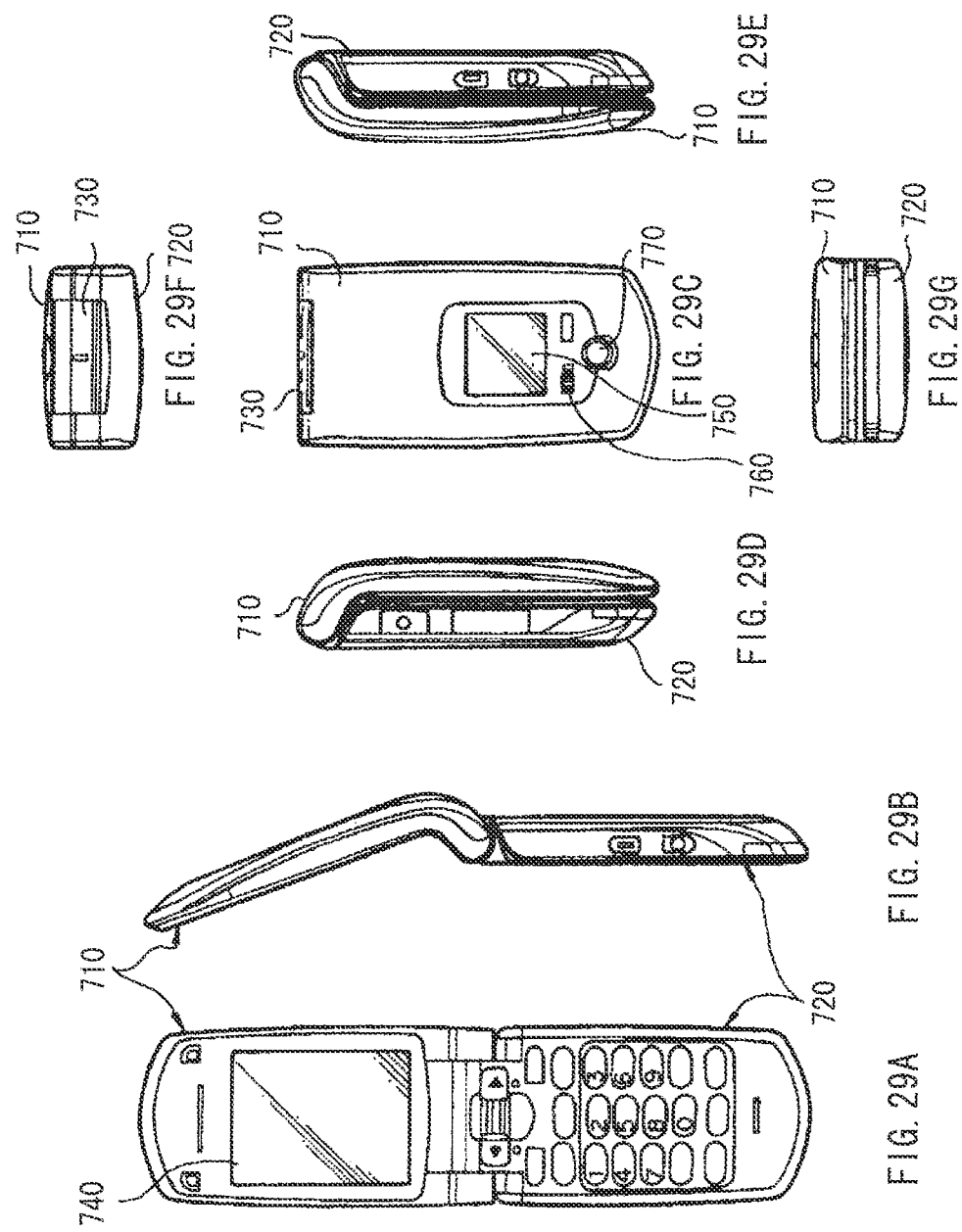
FIGS. 29A to 29G are front diagrams, side diagrams, a top diagram, and a bottom diagram illustrating an appearance configuration of an application example 5.

FIG. 28 shows appearance of a video camera applied with the display panel with a touch detection function according to the embodiments and others. The video camera has, for example, a main body section 541, an object-shooting lens 542 provided on a front side face of the main body section 541, a start/stop switch 543 for shooting, and a display section 544. The display section 544 is configured of the display panel with a touch detection function according to the embodiments and others.

Application Example 5

FIGS. 29A to 29G show appearance of a mobile phone applied with the display panel with a touch detection function according to the embodiments and others. For example, the mobile phone is configured of an upper housing 710 and a lower housing 720 connected to each other by a hinge section 730, and has a display 740, a sub display 750, a picture light 760, and a camera 770. The display 740 or the sub display 750 is configured of the display panel with a touch detection function according to the embodiments and others.

While the present technology has been described with the several embodiments, the modifications, and the application examples to electronic units hereinbefore, the technology is not limited to the embodiments and others, and various modifications or alterations may be made.

For example, while the drive electrodes COML are provided on the TFT substrate 21 and the pixel electrodes 22 are provided on the drive electrodes COML with the insulating film 23 therebetween as shown in FIG. 6 in the embodiments and others, this is not limitative. Instead, for example, the pixel electrodes 22 may be provided on the TFT substrate 21, and the drive electrodes COML may be provided on the pixel electrodes 22 with the insulating film 23 therebetween.

Figure 30:
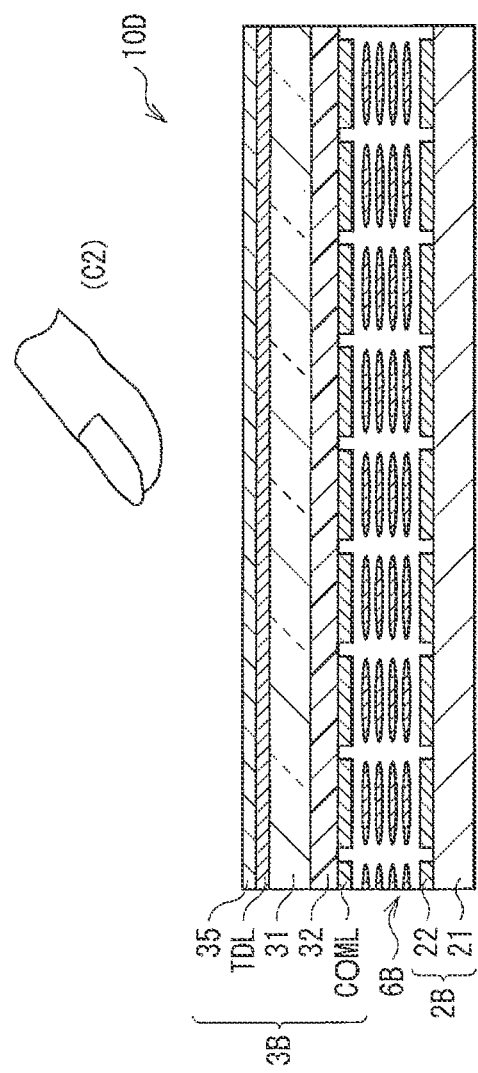
FIG. 30 is a sectional diagram illustrating a schematic sectional structure of a display device with a touch detection function according to a modification.

For example, while the touch detection device is integrated with the liquid crystal display device including liquid crystal of a transverse electric mode such as a FFS mode and an IPS mode in the embodiments and others, the touch detection device may be integrated with a liquid crystal display device including liquid crystal of various modes such as a twisted nematic (TN) mode, a vertical alignment (VA) mode, and an electrically controlled birefringence (ECB) mode instead. In the case where such liquid crystal is used, the display device with a touch detection function is configured as shown in FIG. 30. FIG. 30 illustrates an exemplary sectional structure of a major part of a display device with a touch detection function 10D, showing a configuration where a liquid crystal layer 6B is sandwiched between a pixel substrate 2B and a counter substrate 3B. Since names and functions of other sections are similar to those shown in the case of FIG. 6, description of them is omitted. This example is different from the case of FIG. 6 in that the drive electrodes COML used for both display and touch detection are provided on the counter substrate 3B.

In addition, while, for example, a so-called in-cell type display device, where a liquid crystal display device is integrated with a capacitance-type touch detection device, is used in the above-described embodiments and others, this is not limitative. Instead, for example, a so-called on-cell type display device, where the capacitance-type touch detection device is mounted on the surface of the liquid crystal display device, may be used. In the on-cell type display device, for example, in the case where noise in touch detection drive is transmitted from the touch detection device to the liquid crystal display device, the noise is reduced through the driving as in the embodiments, leading to suppression of a reduction in image quality of the liquid crystal display device.

In addition, for example, while the liquid crystal elements are used for the display elements in the above-described embodiments and others, this is not limitative. Instead, electro luminescence (EL) elements may be used, for example.

It is possible to achieve at least the following configurations from the above-described exemplary embodiments and the modifications of the disclosure.

(1) A display panel with a touch detection function including:
one or more display elements;
one or more drive electrodes;
one or more touch detection electrodes; and
a drive section selectively applying a DC drive signal or an AC drive signal to the drive electrodes.

(2) The display panel according to (1),
wherein the display elements perform write operation for display during a write period,
the AC drive signal has a pulse waveform that transits from a first voltage to a second voltage corresponding to a DC voltage level of the DC drive signal at a transition timing in a period other than the write period,
the drive section applies the AC drive signal to the drive electrodes in an enable period including the transition timing, and applies the DC drive signal to the drive electrodes in a period other than the enable period to perform touch detection drive.

(3) The display panel according to (2),
wherein the AC drive signal has a pulse waveform that includes the first voltage in a pulse period different from the write period, and includes the second voltage in a period other than the pulse period, and
the transition timing corresponds to end timing of the pulse period.

(4) The display panel according to (3), wherein the enable period is in a period other than the write period.

(5) The display panel according to (3) or (4), wherein the enable period includes the pulse period.

(6) The display panel according to (3),
wherein the plurality of display elements are arranged in a matrix and line-sequentially scanned for display operation, and
the enable period corresponds to one horizontal period or consecutive, multiple horizontal periods.

(7) The display panel according to any one of (1) to (6), further including
a drive signal generation section generating the DC drive signal and the AC drive signal,
wherein the drive signal generation section includes
a first-voltage generation sub-section generating the first voltage,
a second-voltage generation sub-section generating a voltage corresponding to a DC voltage level of the DC drive signal,
a buffer circuit generating the second voltage based on the voltage output from the second voltage generation sub-section, and a switching circuit generating the AC drive signal through switching the first voltage and the second voltage from each other.

(8) The display panel according to any one of (2) to (7), further including
a touch detection section,
wherein the drive electrodes are formed to extend in a predetermined direction,
the touch detection electrodes are formed to extend in a direction crossing the extending direction of the drive electrodes in a layer different from a layer of the drive electrodes, and
the drive section sequentially selects one or more drive electrodes among the drive electrodes as a drive object electrode, and drives the drive object electrode for touch detection while applying the DC drive signal to drive electrodes other than the drive object electrode, and
the touch detection section detects a touch event based on signals output from the touch detection electrodes.

(9) The display panel according to any one of (1) to (8),
wherein the display element includes
a liquid crystal layer, and
a pixel electrode provided between the liquid crystal layer and the drive electrodes, or disposed facing the liquid crystal layer with the drive electrodes therebetween.

(10) The display panel according to any one of (1) to (8),
wherein the display element includes
a liquid crystal layer, and
a pixel electrode disposed facing the drive electrodes with the liquid crystal layer therebetween.

(11) A method of driving a display panel with a touch detection function, including:
driving one or more display elements for display; and
selectively applying a DC drive signal or an AC drive signal to one or more drive electrodes.

(12) A drive circuit including:
a display drive section driving one or more display elements; and
a touch detection drive section selectively applying a DC drive signal or an AC drive signal to one or more drive electrodes.

(13) An electronic unit including:
a display panel with a touch detection function; and
a control section controlling operation using the display panel with a touch detection function,
wherein the display panel with a touch detection function includes
one or more display elements,
one or more drive electrodes,
one or more touch detection electrodes, and
a drive section selectively applying a DC drive signal or an AC drive signal to the drive electrodes.

The present disclosure contains subject matter related to that disclosed in Japanese Priority Patent Application JP 2011-89429 filed in the Japan Patent Office on Apr. 13, 2011 and Japanese Priority Patent Application JP 2011-242797 filed in the Japan Patent Office on Nov. 4, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A driving circuit for an FFS display panel having a plurality of pixel electrodes and a plurality of common electrodes, the driving circuit comprising
an output wiring configured to selectively output a first drive signal or a second drive signal for driving at least one of the common electrodes,
wherein
the output wiring outputs:
the first drive signal for driving at least one of the common electrodes in order to perform a display operation on the display panel for display during a first period; and
the second drive signal for driving at least one of the common electrodes in order to perform a touch detection in a second period other than the first period, the second drive signal being different from the first drive signal and having a pulse waveform that transitions from a first voltage to a second voltage.

2. The driving circuit according to claim 1, wherein
the first drive signal is a DC signal,
the second drive signal is an AC signal,
the first period is a display period, and
the second period is a touch detection period.

3. The driving circuit according to claim 2, wherein
the driving circuit drives at least one common electrode in the touch detection period.

4. The driving circuit according to claim 3, wherein
the driving circuit drives the common electrodes in the touch detection period.

5. The driving circuit according to claim 1, wherein
the output wiring is configured to:
sequentially select at least one of the common electrodes each extending in a predetermined direction, as a drive object electrode; and
drive the drive object electrode for touch detection while applying the first drive signal to at least one of the common electrodes other than the drive object electrode, and
the touch detector comprises a touch detection section that detects a touch event based on signals output from the drive object electrodes.

6. The driving circuit according to claim 1, further comprising a switch element to apply:
the first drive signal to at least one of the common electrodes in the first period; and
the second drive signal to at least one of the common electrodes in the second period.

7. The driving circuit according to claim 1, further comprising an AC-drive-signal wire and a DC-drive-signal wire, wherein
the driving circuit is configured to output:
the second drive signal supplied from the AC-drive-signal wire; and
the first drive signal supplied from the DC-drive-signal wire.

8. The driving circuit according to claim 1, further comprising a first DC-drive-signal wire and a second DC-drive-signal wire, and
the driving circuit is configured to output:
the second drive signal that is a signal alternately supplied from the first DC-drive-signal wire and the second DC-drive-signal wire; and
the first drive signal that is either a first DC drive signal from the first DC-drive-signal wire or a second DC drive signal from the second DC-drive-signal wire.

9. The driving circuit according to claim 8, wherein the driving circuit is configured to output the second DC drive signal supplied from the second DC-drive-signal wire, the second DC drive signal being lower than the first DC drive signal supplied from the first DC-drive-signal wire.

10. The driving circuit according to claim 7, wherein the second drive signal supplied to the AC-drive-signal wire is a signal generated by allowing a buffer circuit to alternately switch
a first power source to output a first DC voltage and
a second power source to output a second DC voltage that is lower than the first DC voltage.

11. The driving circuit according to claim 8, wherein
a first DC drive voltage supplied to the first DC-drive-signal wire is supplied from the first power source,
a second DC drive voltage supplied to the second DC-drive-signal wire is supplied from the second power source, and
the second DC voltage is lower than the first DC voltage.

12. An IC chip for an FFS display panel having a plurality of pixel electrodes and a plurality of common electrodes, the IC chip comprising
an output wiring that selectively outputs a first signal or a second signal for driving at least one of the common electrodes,
wherein
the output wiring outputs:
the first signal for driving at least one of the common electrodes in order to perform a display operation on the display panel for display during a first period; and
the second signal for driving at least one of the common electrodes in order to perform a touch detection in a second period other than the first period, the second drive signal being different from the first drive signal and having a pulse waveform that transitions from a first voltage to a second voltage.

13. The IC chip according to claim 12, wherein
the first drive signal is a DC signal,
the second drive signal is an AC signal,
the first period is a display period, and
the second period is a touch detection period.

14. The IC chip according to claim 13, wherein
the IC chip drives at least one common electrode in the touch detection period.

15. The IC chip according to claim 14, wherein
the IC chip drives the common electrodes in the touch detection period.

16. The IC chip according to claim 12, wherein
the output wiring is configured to:
sequentially select at least one of the common electrodes each extending in a predetermined direction, as a drive object electrode; and
drive the drive object electrode for touch detection while applying the first drive signal to at least one of the common electrodes other than the drive object electrode, and
the touch detector comprises a touch detection section detects a touch event based on signals output from the drive object electrodes.

17. The IC chip according to claim 12, further comprising a switch element to apply:
the first drive signal to at least one of the common electrodes in the first period; and
the second drive signal to at least one of the common electrodes in the second period.

18. The IC chip according to claim 12, further comprising an AC-drive-signal wire and a DC-drive-signal wire, wherein the IC chip is configured to output:

the second drive signal supplied from the AC-drive-signal wire; and the first drive signal supplied from the DC-drive-signal wire.

19. The IC chip according to claim 12, further comprising a first DC-drive-signal wire and a second DC-drive-signal wire, and the IC chip is configured to output:

the second drive signal that is a signal alternately supplied from the first DC-drive-signal wire and the second DC-drive-signal wire; and the first drive signal that is either a first DC drive signal from the first DC-drive-signal wire or a second DC drive signal from the second DC-drive-signal wire.

20. The IC chip according to claim 19, wherein the IC chip is configured to output the second DC drive signal supplied from the second DC-drive-signal wire, the second DC drive signal being lower than the first DC drive signal supplied from the first DC-drive-signal wire.

21. The IC chip according to claim 18, wherein the second drive signal supplied to the AC-drive-signal wire is a signal generated by allowing a buffer circuit to alternately switch a first power source to output a first DC voltage and a second power source to output a second DC voltage that is lower than the first DC voltage.

\* \* \* \* \*